United States Patent
Eldessouki

(10) Patent No.: US 12,136,340 B2
(45) Date of Patent: *Nov. 5, 2024

(54) CAMERA ROADWAY MONITORING METHOD AND SYSTEM

(71) Applicant: Imam Abdulrahman Bin Faisal University, Dammam (SA)

(72) Inventor: Wael Mohamed Elsayed Ali Eldessouki, Al Khobar (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,371

(22) Filed: Mar. 8, 2024

(65) Prior Publication Data

US 2024/0212489 A1 Jun. 27, 2024

Related U.S. Application Data

(63) Continuation of application No. 17/140,730, filed on Jan. 4, 2021, now Pat. No. 11,978,341.

(51) Int. Cl.
*G08G 1/054* (2006.01)
*G06Q 50/26* (2024.01)
(Continued)

(52) U.S. Cl.
CPC ........... *G08G 1/054* (2013.01); *G08G 1/0112* (2013.01); *G08G 1/0116* (2013.01);
(Continued)

(58) Field of Classification Search
None
See application file for complete search history.

(56) References Cited

U.S. PATENT DOCUMENTS

| 11,488,470 B2 | 11/2022 | AEllid |
| 2002/0036572 A1 | 3/2002 | Yamaki |

(Continued)

FOREIGN PATENT DOCUMENTS

| WO | WO-2018/0577 50 A1 | 3/2018 |
| WO | WO 2020/046218 A1 | 3/2020 |

OTHER PUBLICATIONS

Tyler Zellmer, "Development of Stationary and Mobile Tailgating Detection Solutions for Ground Vehicles", TigerPrints, All Theses, Mechanical Engineering Commons, https://tigerprints.clemson.edu/all_theses, Aug. 2013, 110 pages.

(Continued)

*Primary Examiner* — Thomas E Worden
(74) *Attorney, Agent, or Firm* — Oblon, McClelland, Maier & Neustadt, L.L.P.

(57) ABSTRACT

A system for detecting aggressive driving on a roadway in real time includes spaced apart cameras and spaced apart presence sensors which generate timestamps when detecting passing vehicles. A GPS module and a communication module are operatively connected to a computer monitoring unit which determines the aggressive driving. A photographic image is taken of each vehicle which is driving aggressively and the image and a violation report is transmitted to a transit authority. The system may be a static system mounted in the median of a roadway or may be a dynamic system mounted in a monitoring vehicle. The aggressive driving violations may be one of speeding, tailgating, street racing, improper passing, and lane blocking.

5 Claims, 16 Drawing Sheets

(51) Int. Cl.
    *G08G 1/01*           (2006.01)
    *G08G 1/017*         (2006.01)
    *H04W 4/44*         (2018.01)

(52) U.S. Cl.
    CPC ............ *G08G 1/0175* (2013.01); *H04W 4/44* (2018.02); *G06Q 50/26* (2013.01)

(56) References Cited

U.S. PATENT DOCUMENTS

| | | |
|---|---|---|
| 2002/0141618 A1 | 10/2002 | Ciolli |
| 2003/0214585 A1 | 11/2003 | Bakewell |
| 2004/0222904 A1 | 11/2004 | Ciolli |
| 2004/0252193 A1 | 12/2004 | Higgins |
| 2008/0061953 A1 | 3/2008 | Bhogal et al. |
| 2010/0302371 A1 | 12/2010 | Abrams |
| 2012/0287278 A1 | 11/2012 | Danis |
| 2013/0278768 A1 | 10/2013 | Paul et al. |
| 2018/0137754 A1 | 5/2018 | Alon |
| 2018/0211117 A1 | 7/2018 | Ratti |
| 2021/0081907 A1 | 3/2021 | Solomon |

OTHER PUBLICATIONS

"RTMS G4", Autoscope, International Road Dynamics Inc. (IRD), www.irdinc.com, 2 pages.

"Automotive Radar High-resolution 77 GHz radar", Freescale Xtrinsic, NXP, freescale.com/sensors, Document Number: AUTORADARFS, 2011, 2 pages.

CAMERA ROADWAY MONITORING METHOD AND SYSTEM

CROSS-REFERENCE TO RELATED APPLICATIONS

The present application is a Continuation of U.S. application Ser. No. 17/140,730, now allowed, having a filing date of Jan. 4, 2021.

BACKGROUND

Technical Field

The present disclosure is directed to a system which detects the violation of laws related to aggressive driving.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Aggressive driving behavior has become a troubling phenomenon during the past two decades. According to a report of the American Automobile Association Foundation for Traffic Safety, 56% of traffic accidents occur due to aggressive driving behavior. (See "Aggressive driving: Research update". 2009. Technical report, AAA Foundation for Traffic Safety, Washington D.C., U.S.A., incorporated herein by reference in its entirety). Moreover, traffic accidents cost billions of dollars each year for people, governments and companies. Aggressive driving violations are considered to be of the major causes of fatal accidents. A variety of laws and regulations have been written to address aggressive driving. However, police enforcement of the current legislations has been inadequate in curtailing aggressive driving. According to reports and statistics by the US Department of Justice, the common cause of the persistence of the aggressive driving problem is lack of enforcement. The lack of enforcement is attributed to the fact that aggressive driving violations are hard for law enforcement personnel to detect and to issue citations for violators. For example, tailgating is one of the most dangerous aggressive driving behaviors as it intimidates and threatens the driver in the leading vehicle and may lead to erratic and violent responses in retaliation. One dangerous scenario is that the driver in the leading vehicle may intentionally slow down and not let the following vehicle pass. This action is also considered to be an aggressive driving violation. The presence of law enforcement in the vicinity may act as a deterrent to such aggressive driving, yet police coverage is not high enough to detect and ticket every violation.

Accordingly, it is one object of the present disclosure to provide methods and systems for detecting and citing aggressive driving violations on highways and freeways. In a first aspect, a static system focuses on detecting speeding, tailgating, and lane blocking violations. In a second aspect, a mobile system utilizes an extended floating car technique to detect speeding, tailgating, lane blocking, and improper passing.

SUMMARY

In an exemplary embodiment, a system for detecting aggressive driving violations of vehicles travelling on a roadway is described. The system comprises a plurality of presence sensors spaced apart from one another, at least three digital cameras, a communication unit, a GPS receiver, a computer monitoring unit, wherein the monitoring unit is configured to receive signals from the presence sensors and determine relative speeds and time gaps between the vehicles from the signals, detect whether either a first vehicle or a second vehicle is driving aggressively, instruct at least one of the digital cameras to photograph a license plate of the first or second vehicle if either the first or the second vehicle is driving aggressively, and instruct the communication unit to transmit a violation report to a transit authority.

In another exemplary embodiment, a system is a roadway detection system placed on a roadway median, comprising cameras spaced apart on the roadway median, presence sensors spaced apart on the roadway median and configured to generate timestamps when detecting passing vehicles, a communication unit, computer processing circuitry configured to, determine aggressive driving violations by passing vehicles in real-time by comparing the timestamps, instruct the cameras to take photos of front and/or rear license plates of offending vehicles, and instruct the communication unit to transmit the photos to a transit authority regarding the aggressive driving violations, wherein the aggressive driving violations include speeding, lane blocking, improper passing and tailgating.

In another exemplary embodiment, a system is described for detecting aggressive driving violations of vehicles travelling on a roadway, comprising a mobile unit including a plurality of presence sensors, at least three digital cameras, a communication unit and a monitoring unit, wherein the monitoring unit includes a computer, a digital storage unit and a GPS module, and is operatively connected to a vehicle CAN unit. The monitoring unit is configured to receive signals from the presence sensors and the digital cameras, determine relative speeds of and distances between vehicles passing the mobile unit from the signals, detect whether either the first vehicle or the second vehicle is driving aggressively, instruct a digital camera to photograph either the first and the second vehicle when the first or the second vehicle is driving aggressively, and instruct the communication unit to transmit a violation report to a transit authority identifying an aggressive driving violation and including the photograph of the vehicle which is driving aggressively.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
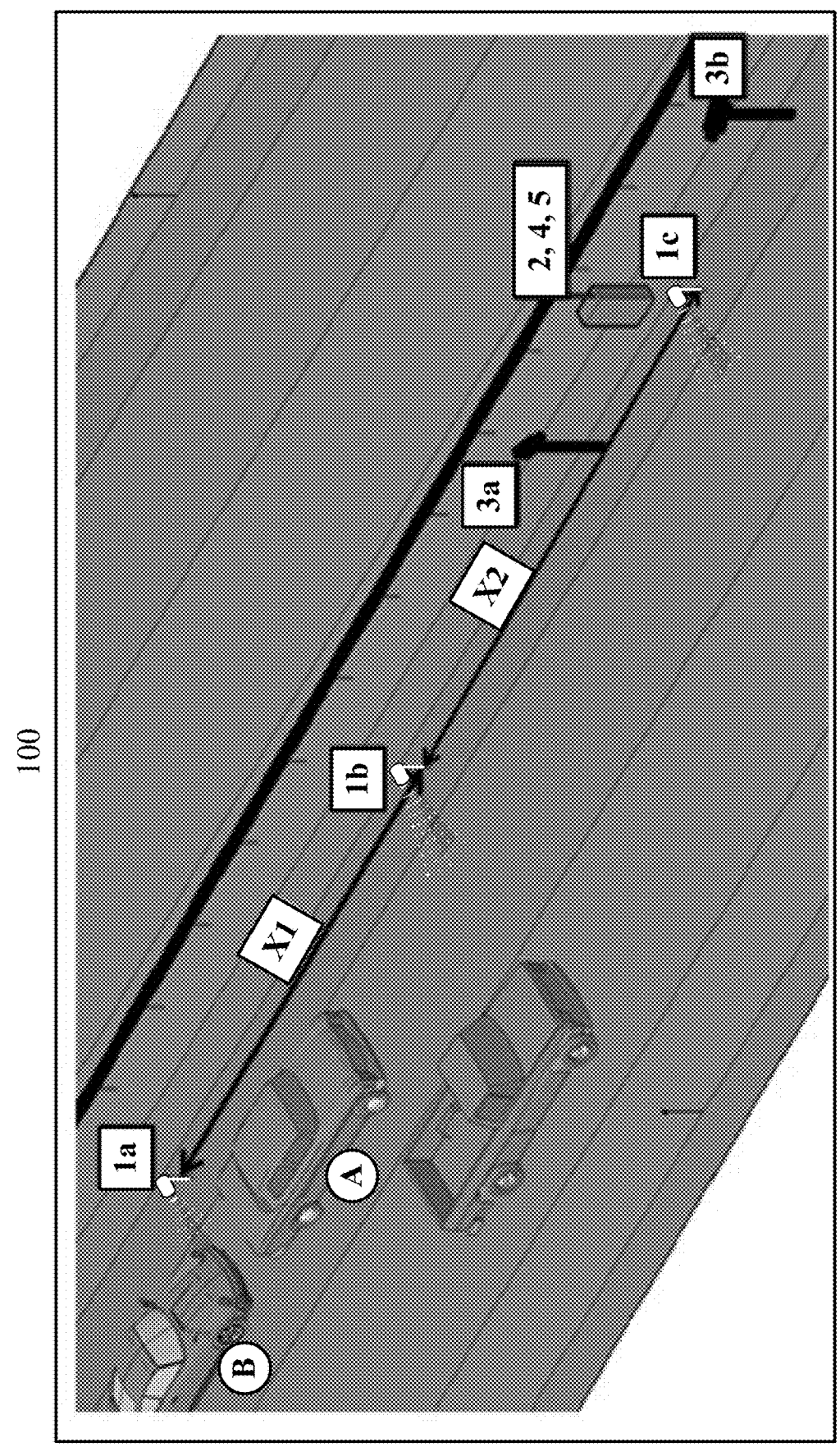
FIG. 1 illustrates a tailgating enforcement system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The term "headway" is defined as the average interval of time between vehicles moving in the same direction on the same route.

Aspects of this disclosure are directed to systems for detecting aggressive driving violations in real-time.

In one aspect, a static system for detecting aggressive driving violations is described. The system is designed to detect speeding, tailgating and lane blockage. The violations are detected by roadside monitoring and the violators are then cited. In order to detect the violations, the following data must be collected:
 1. Individual speeds for the vehicles passing an array of roadside sensors.
 2. Time stamps for the vehicles passing an array of roadside sensors.
 3. The time gap between any two successive vehicles.
 4. Images of vehicles making the violations.

Thus, the system includes computing and processing means to control data collection of data, search the images for identifying information, detect violations, prepare violation reports and communicate the violations to a transit authority.

As depicted in FIG. 1, the system includes the following components for data collection and processing. Presence sensors (1a), (1b), (1c), which may be ultrasonic, radar, microwave, lidar, or other viable means of detection, digital cameras (3a) and (3b), a computer processing unit (2), digital storage media (4) and a communication modem (5).

In an aspect, the static system may be mounted on a support so that the presence sensors and cameras have defined positions and orientations. The electronics, such as the computer processing unit (2), digital storage media (3) and a communication modem (5), may be embedded in the support for stability and protection from theft and the environment. In this aspect, human error in installation is minimized. The support may have wheels, so it can be towed to an installation site or may alternatively be carried by a trailer. The support may be constructed of steel, stainless steel, heavy-duty rubber, ceramic or other structural support materials. The support is designed to be mounted on the median of the highway and has leveling arms to be oriented level to the ground.

The support may have a length L and a width W. In a non-limiting example, the width may be one meter. The length may be divided into sub-lengths, L/N, where N is the number of sub-lengths, for convenience in transporting the static system. The sub-lengths may be marked and fitted together by clamps or the like. In a non-limiting example, the length L is 10 meters and the number of sub-lengths is 5, so that each sub-length is 2 meters long. Each presence sensor may be mounted on a stand fitted into the support. The stand may have a mounting bracket which is placed at a height H1 from the support. The mounting bracket is configured to hold the presence sensor at an orientation parallel to the width of the support. The mounting bracket may be adjustable in height. In a non-limiting example, the height H1 may be selected from the range of 0.5 to 1.5 meters. The mounting bracket may further be configured for adjusting the orientation of the presence sensor. Each camera may be mounted on a camera stand fitted into the support. The camera stand may have a mounting bracket which is placed at a height H2 from the support. The mounting bracket is configured to hold the camera at an orientation parallel to the width of the support. The mounting bracket may be adjustable in height. In a non-limiting example, the height H2 may be selected from the range of 0.5 to 2 meters. The mounting bracket may further be configured for adjusting the orientation of the camera.

The presence sensors are mounted on the median of the highway and hence, the primary focus of the system is on detecting speeding, tailgating and lane blocking violations in the left lane of the highway. The presence sensors are range-finding sensors and may be ultrasonic based, laser-based, microwave, frequency modulated continuous wave or infrared-based, but must have a high rate of distance scanning update capability and a detection range which covers at least one lane width. In a non-limiting example, the presence sensor may be an RTMS G4 radar-based sensor designed to be mounted on poles on the sides of a roadway for the detection and measurement of traffic and is available from International Road Dynamics Inc., 702-43rd Street East, Saskatoon, SK., Canada.

Figure 2:
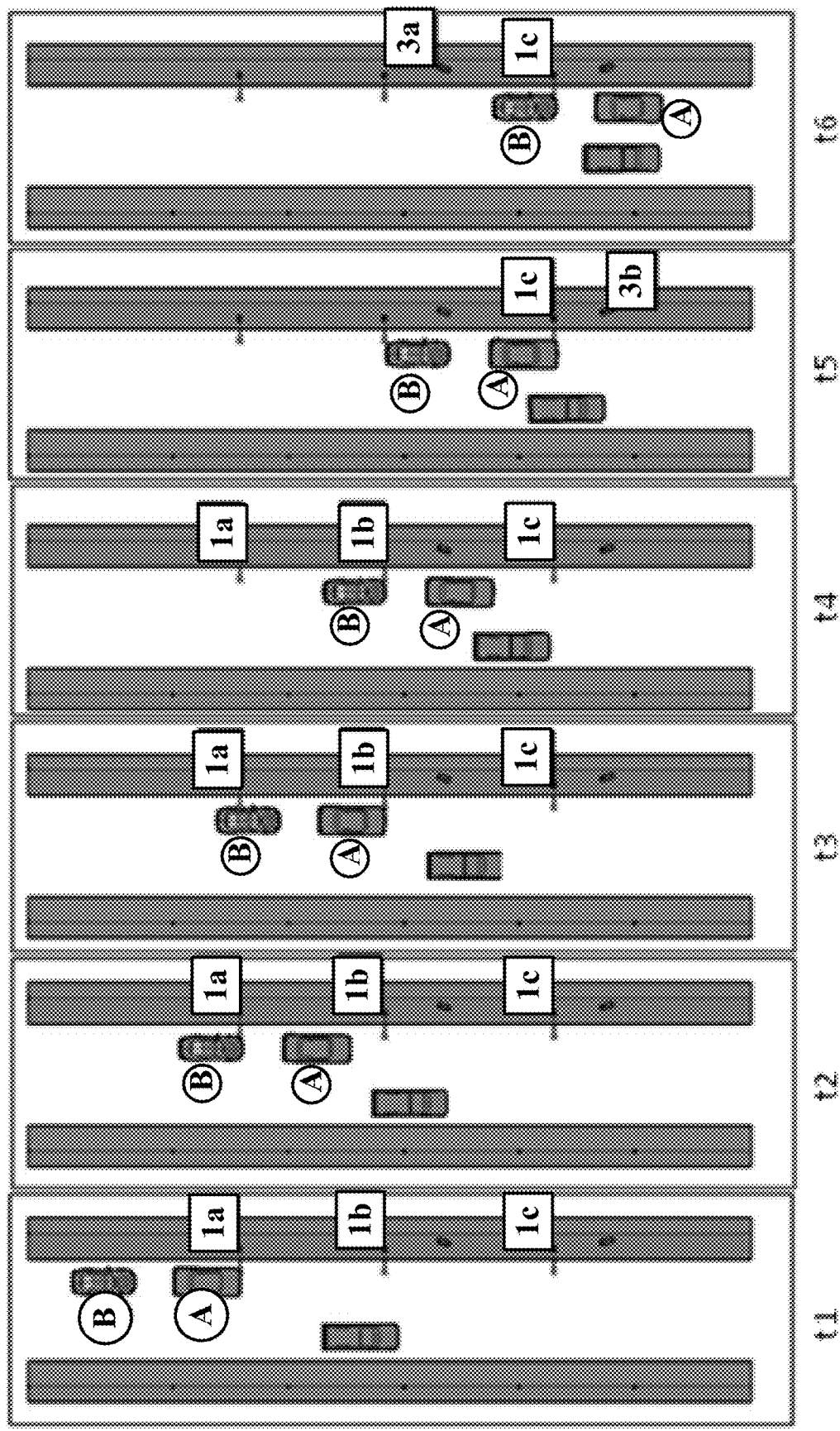
FIG. 2 illustrates the tailgating detection operational concept.

Tailgating is defined as the situation where a vehicle is observed following another vehicle closely with very low time headway. As depicted in FIGS. 1 and 2, in tailgating cases, three scenarios may occur:
 1. First scenario: vehicle (B) is following too closely while trying to pass vehicle (A), while the driver of vehicle (A) is driving at the speed limit or even slightly above the speed limit. In this situation, the driver of vehicle (B) is considered to be in violation and is intimidating the driver of vehicle (A) by tailgating.

2. Second scenario: the driver of vehicle (B) wants to pass, while vehicle (A) is driving slower than the speed limit and is intentionally blocking the left lane. In this situation, the driver of vehicle (A) is in violation and is cited for lane blocking. If vehicle (B) was tailgating, vehicle (B) is also in violation and is cited for tailgating.

3. The third scenario is similar to the second scenario but with an exception, which is that the following vehicle (B) is not tailgating vehicle (A); therefore vehicle (A) is cited for lane blocking.

Figure 3:
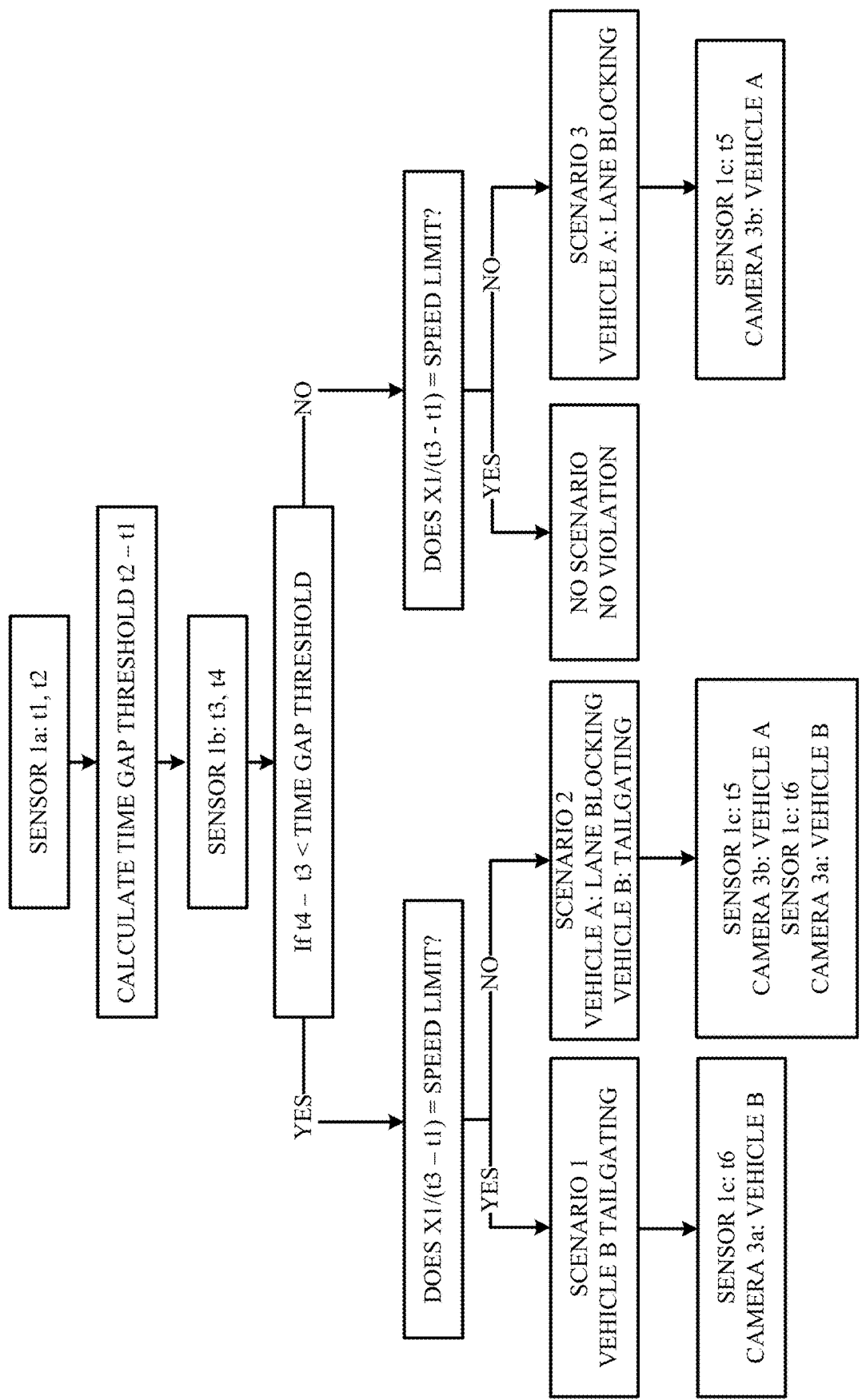
FIG. 3 is a flowchart illustrating a detection algorithm for tailgating and lane blocking.

Referring to FIG. 1-3, at time t1, vehicle (A) passes sensor 1a. At time t2 vehicle (B) passes sensor 1a. At time t3, vehicle (A) passes sensor 1b. At time t4, vehicle (B) passes sensor 1b. At time t5, vehicle (A) passes sensor 1c. At time t6, vehicle (B) passes sensor 1c. The time gap between vehicle (A) and vehicle (B) is t1–t2 at sensor 1a, is t3–t4 at sensor 1b and is t5–t6 at sensor 1c.

If the time gap between two successive vehicles is less than a minimum time gap (τ), then based on the passing times for both vehicles at the successive sensor (1b), the time gap is assessed again. If the time headway is unsafe or below the minimum time gap, tailgating is indicated. As a result, the speed of the lead vehicle (A) is estimated by X1/(t3−t1), and compared with the speed limit for the highway.

The minimum time gap (τ) depends on the relative difference in speeds of vehicles (A) and (B). If the velocity of vehicle (B) is greater than the velocity of vehicle (A) by 5 mph (8 kph), and vehicle (B) is less than two car lengths behind vehicle (A), then vehicle (B) will impact the bumper of vehicle (A) in about two seconds, unless vehicle (B) brakes or vehicle (A) speeds up. An average car length is about 15 ft. or about 5 meters. In a non-limiting example, the minimum time gap is 0.45 seconds to 1 second or is in accordance with a value legislated by the relevant lawmaking body.

If the speed of vehicle (A) is within the posted speed limit (±5 mph, for example), then scenario 1 is applied and vehicle (B) is considered to be tailgating. By the time vehicle (B) passes sensor 1c, camera 3a is activated and a picture is taken of the rear plate of vehicle (B) and sent to a transit authority for citation.

If the speed of vehicle (A) is below the speed limit, then scenario 2 is applied and both vehicles are in violation: A for lane blocking and B for tailgating. As each vehicle passes sensor 1c, camera 3a is activated to take a picture of vehicle (B) and camera 3b is activated to take a picture of vehicle (A). Both pictures are sent to a transit authority for citation.

If the time gap between the vehicles upon passing sensor 1b is not less than the time gap limit, then, if the speed of vehicle (A) is at the speed limit, there are no violations. However, if the speed of vehicle (A) is significantly below the speed limit, then scenario 3 applies and vehicle (A) is in violation for lane blocking. Sensor 1c records the time t5 and camera 3b takes a picture of vehicle (A).

Figure 4:
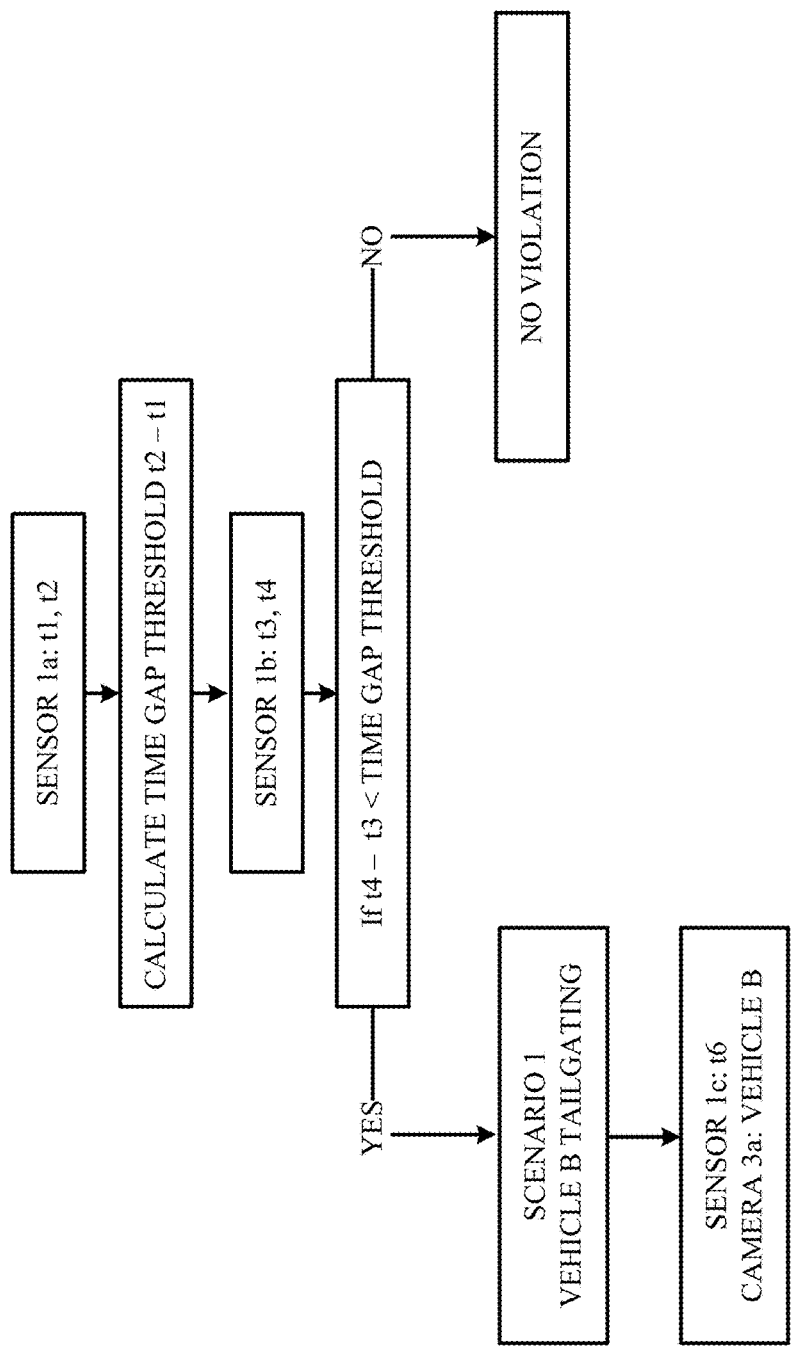
FIG. 4 is a flowchart illustrating a tailgating detection algorithm.

In FIG. 4, if the time gap detected at sensor 1a is above the limit, but when detected at the successive sensor 1b, it was found to be less than the minimum time gap, then scenario 1 applies and vehicle (B) is in violation regardless of the speed of vehicle (A). The reason is that vehicle (B) is accelerating in a short distance in a way that is intimidating for driver of vehicle (A).

In a second aspect, a mobile system for detecting aggressive driving violations is described. The mobile system 500 is mounted/concealed on a monitoring vehicle (X) (unmarked police vehicle, for example) as illustrated in FIG. 5-8. The system is comprised of five presence sensors (1RF), (1RB), (1LF), (1LB) and (1BK), three camera units (2RC), (2LC), and (2BC), a computer (3) with data acquisition channels and data storage unit, global positioning (GPS) receiver (4), and a communication modem (5). The presence sensors are range-finding sensor and may be ultrasonic based, laser based, microwave, frequency modulated continuous wave or infrared based, but must have a high rate of distance scanning update capability and a detection range covers at least one lane width. The presence sensors are mounted and concealed on vehicle (X) as illustrated in FIGS. 5, 6, 7 and 8. In a non-limiting example, the presence sensors may be high resolution TEF810X RFCMOS 77 GHz radar transceivers designed to monitor the environment around a vehicle and available from NXP Semiconductors Netherlands B.V., High Tech Campus 60, 5656 AG Eindhoven, The Netherlands.

Figure 5:
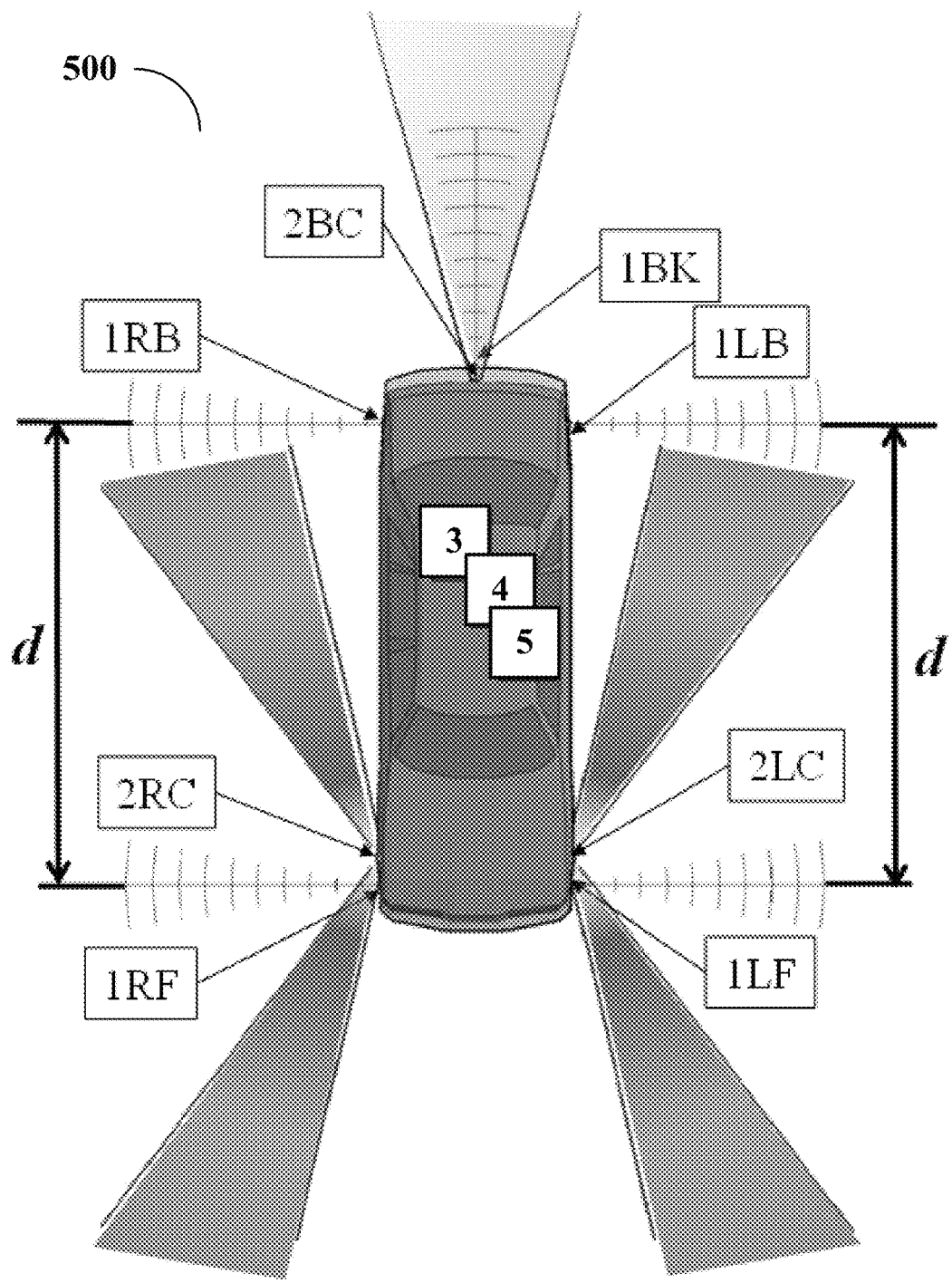
FIG. 5 illustrates the mobile detection vehicle sensors and system layout.
Figure 6:
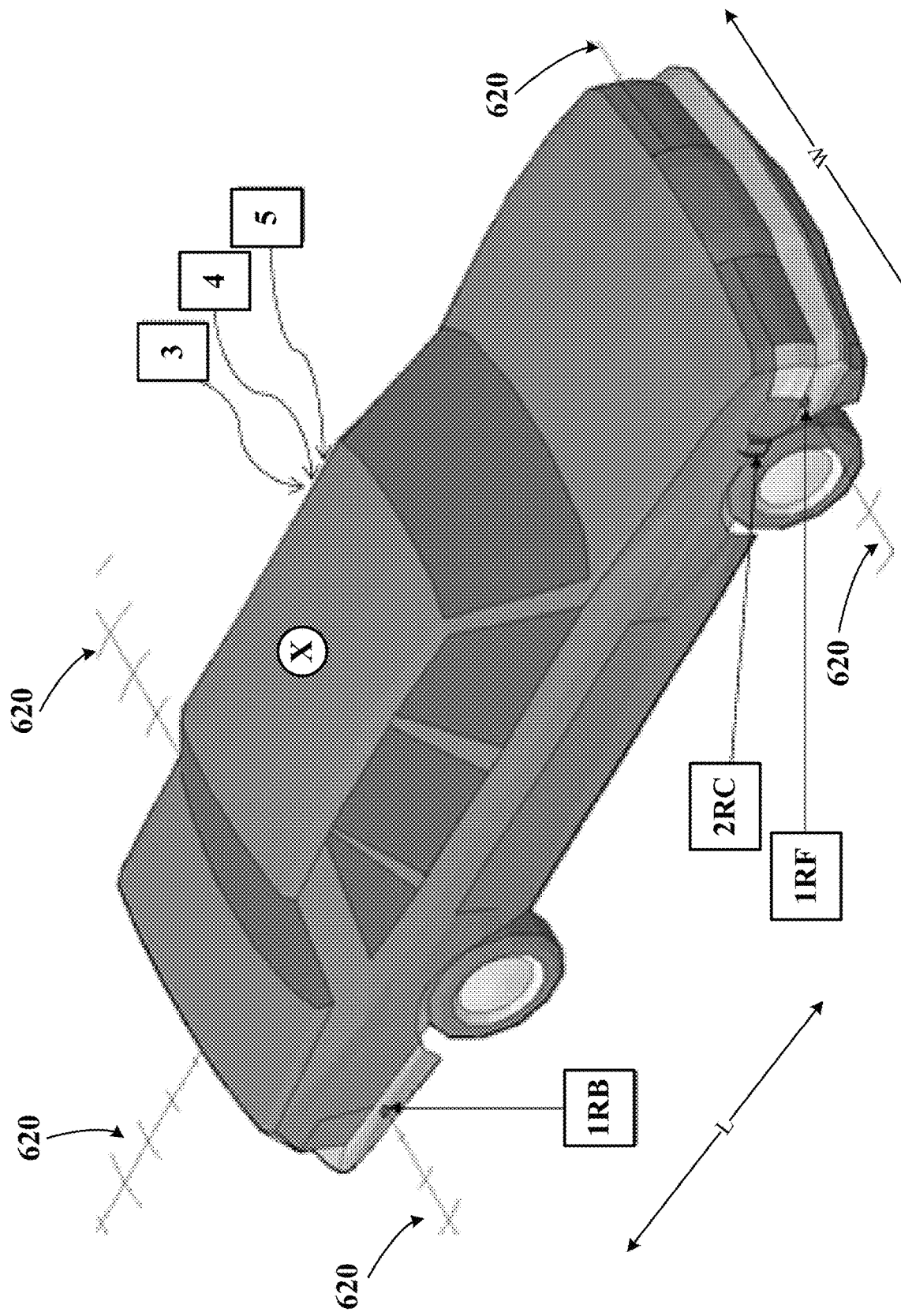
FIG. 6 illustrates the mobile detection vehicle sensor mounting details.

The three digital camera units are mounted on vehicle (X) as shown in FIG. 5. Two of the camera units contain front and back cameras (2RC and 2LC) to cover the right and left sides of the vehicle as shown in FIGS. 5 and 6. Camera unit 2BC has only one camera mounted on the back of the vehicle. The cameras function to capture images of the plate numbers of violating vehicles. The cameras may be similar to the types of cameras already mounted on vehicles for back-up systems. However, the cameras of the present disclosure are directed as shown in FIG. 5. FIG. 6 illustrates the right side of vehicle (X) showing the camera and presence sensor positions. The interrogation fields are indicated by arrows 620. The length and width of the vehicle are indicated by the double-headed arrows.

Figure 7:
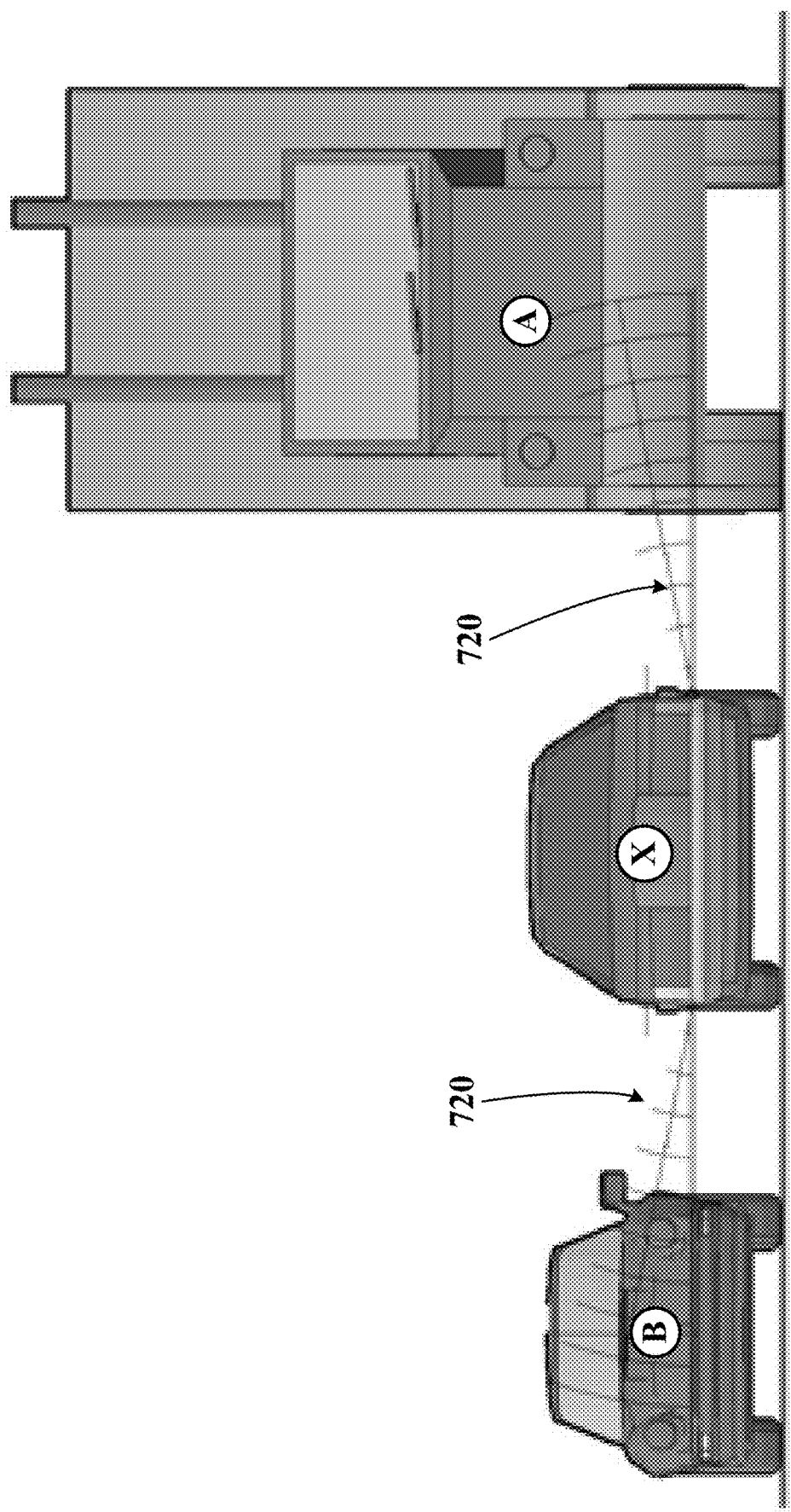
FIG. 7 illustrates the mobile detection sensors' detection angle.

FIG. 7 illustrates the scenario where a vehicle is passing on either side of vehicle (X). The detection zones 720 on either side of vehicle (X) are depicted. In this situation, if either vehicle passes vehicle (X), then that vehicle is speeding and is cited.

Figure 11A:
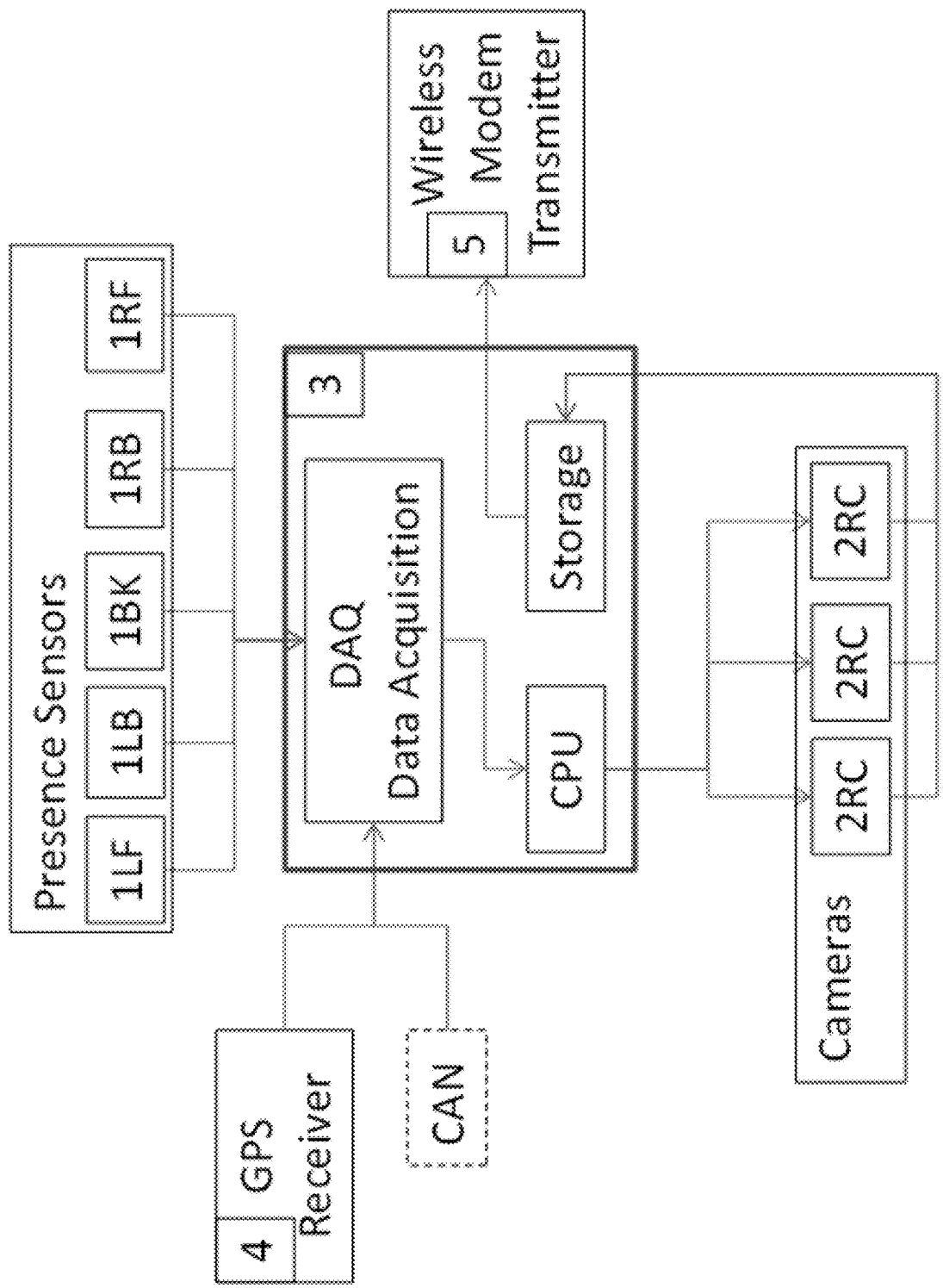
FIG. 11A illustrates the system architecture of the mobile system.

The presence sensors and cameras are connected and controlled by the computer unit (3) through the data acquisition channels mounted in the monitoring vehicle. Also, a GPS receiver (4) is included to determine the precise location and speed data of the monitoring vehicle. The speed of the monitoring vehicle will also be acquired from the vehicle data bus by connecting the computer unit (3) to the vehicle CAN network. Finally, there is a wireless communication modem (5) to upload violations incidents regularly to a transit authority for archival and citation processing as shown in FIG. 11A.

In order to detect the violations, the following data must be collected:
1. Individual speeds for the vehicles passing sensors on the monitoring vehicle.
2. Time stamps for the vehicles passing each sensor on the monitoring vehicle.
3. The time gap between any two successive vehicles.
4. Images of vehicles making the violations.
5. CAN data from the monitoring vehicle's CAN unit, which includes the speed of the monitoring vehicle.

Further, the system includes computing and processing means to control the collection of data, search the images for identifying information, detect violations, prepare violation reports and communicate the violations to a transit authority.

The primary traffic violations the current system is designed to detect are as follows:
1. Speeding and tailgating
2. Street racing
3. Improper passing (right hand takeover)

Detecting Speeding and Tailgating

Figure 8:
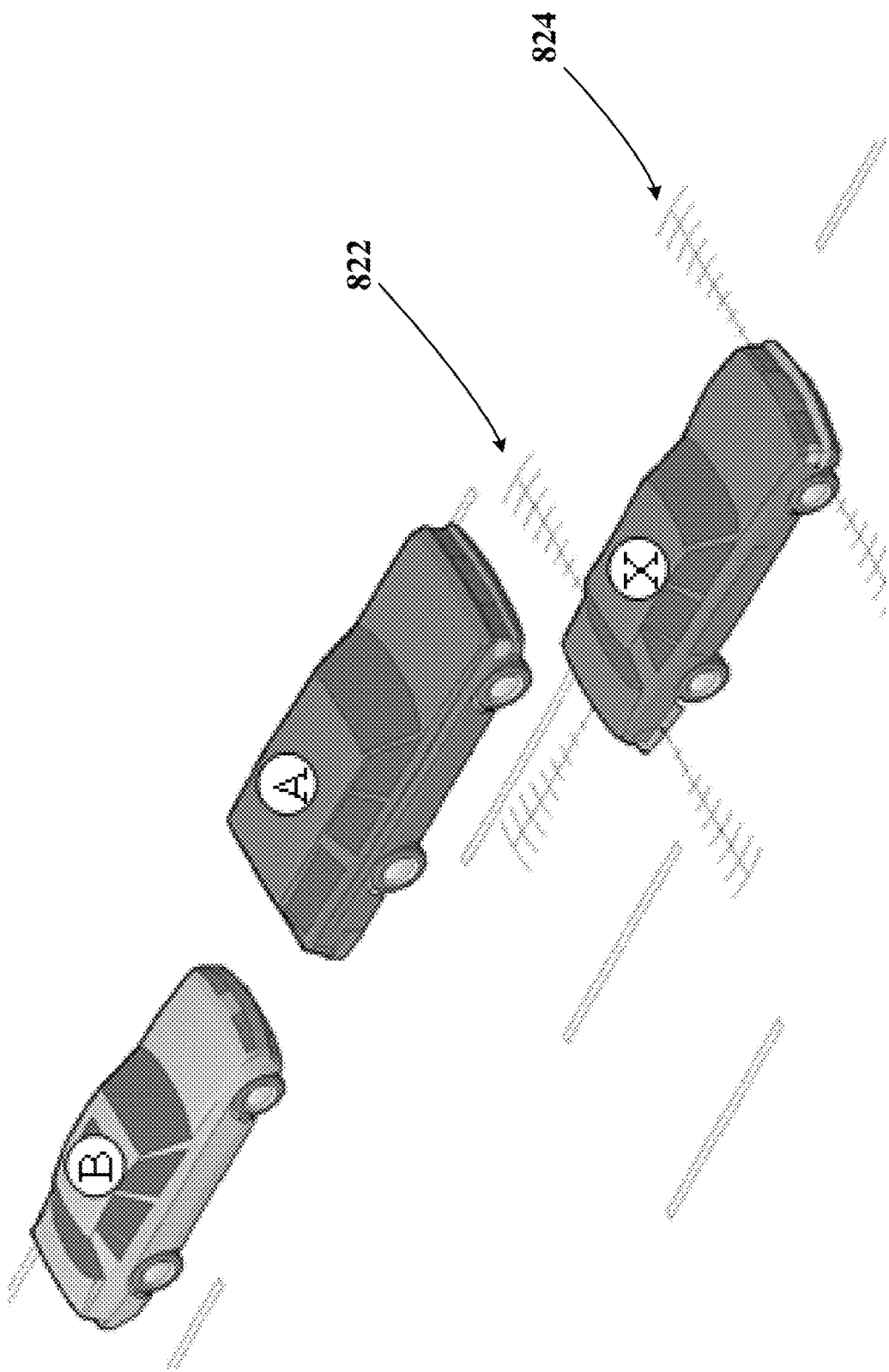
FIG. 8 is an illustration for passing vehicle (A) followed by a tailgating vehicle (B)

As mentioned above, tailgating is defined as a vehicle following another vehicle closely with very low detected time gap between the vehicles (e.g., less than 1 sec or less than a legislated minimum time gap). In tailgating cases, several scenarios may be occurring. The first scenario is that vehicle (B) as illustrated in FIG. 8 is closely following vehicle (A). While passing the mobile detection vehicle (X), the computing unit (3) must update speed data for vehicle (X) ($V_X$) from the GPS receiver (4) and from the vehicle CAN data network (5). As vehicle (A) approaches the left rear sensor 1LB of vehicle (X), it enters the detection zone 822. The presence sensor 1LB registers the time of entry to zone 822 as a first timestamp (t1). Similarly, as vehicle (A) approaches the left front sensor of vehicle (X), it enters detection zone 824 and a second time stamp (t2) is registered.

Figure 9:
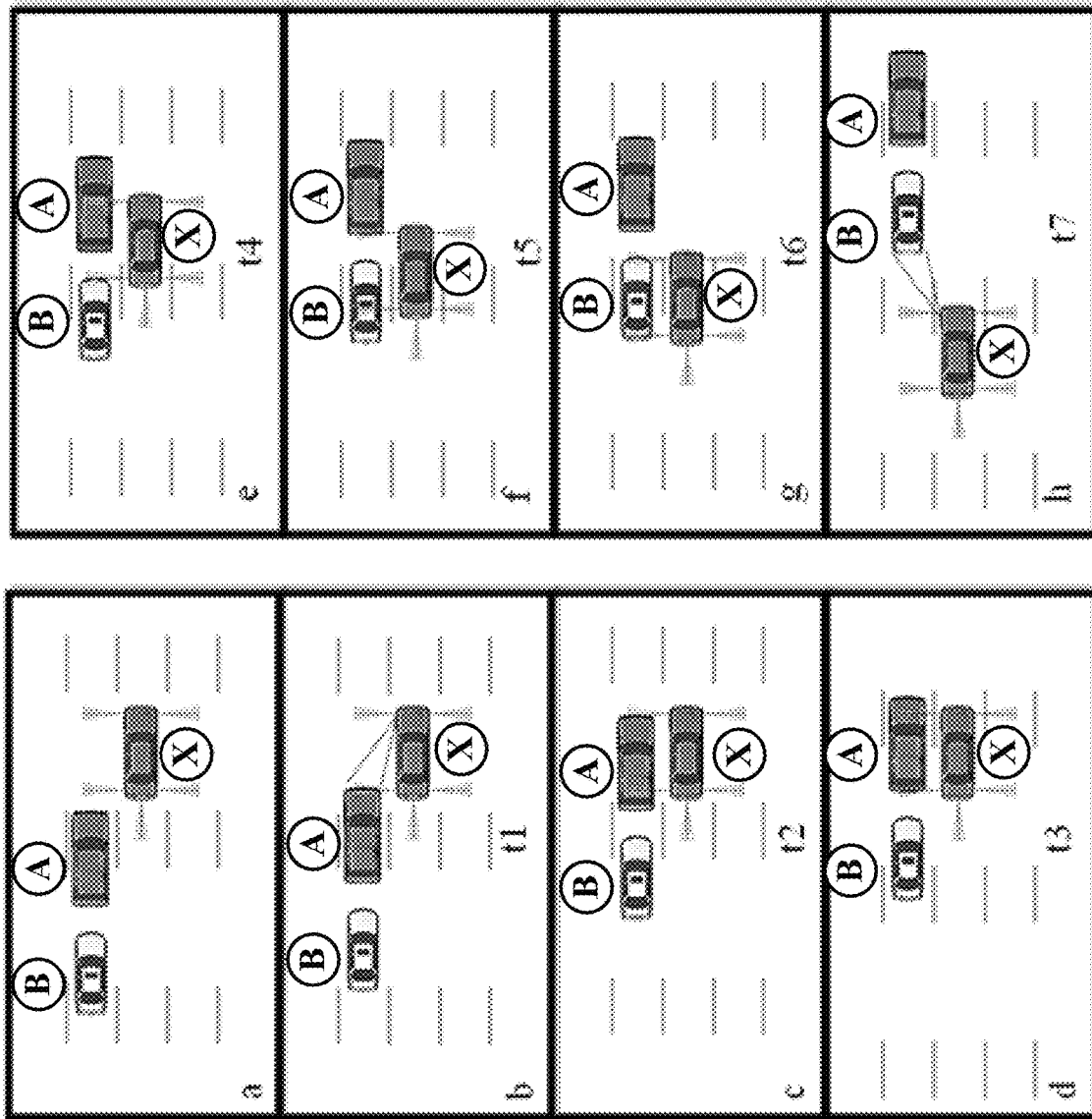
FIG. 9 illustrates the tailgating detection in a right hand passing maneuver.
Figure 10:
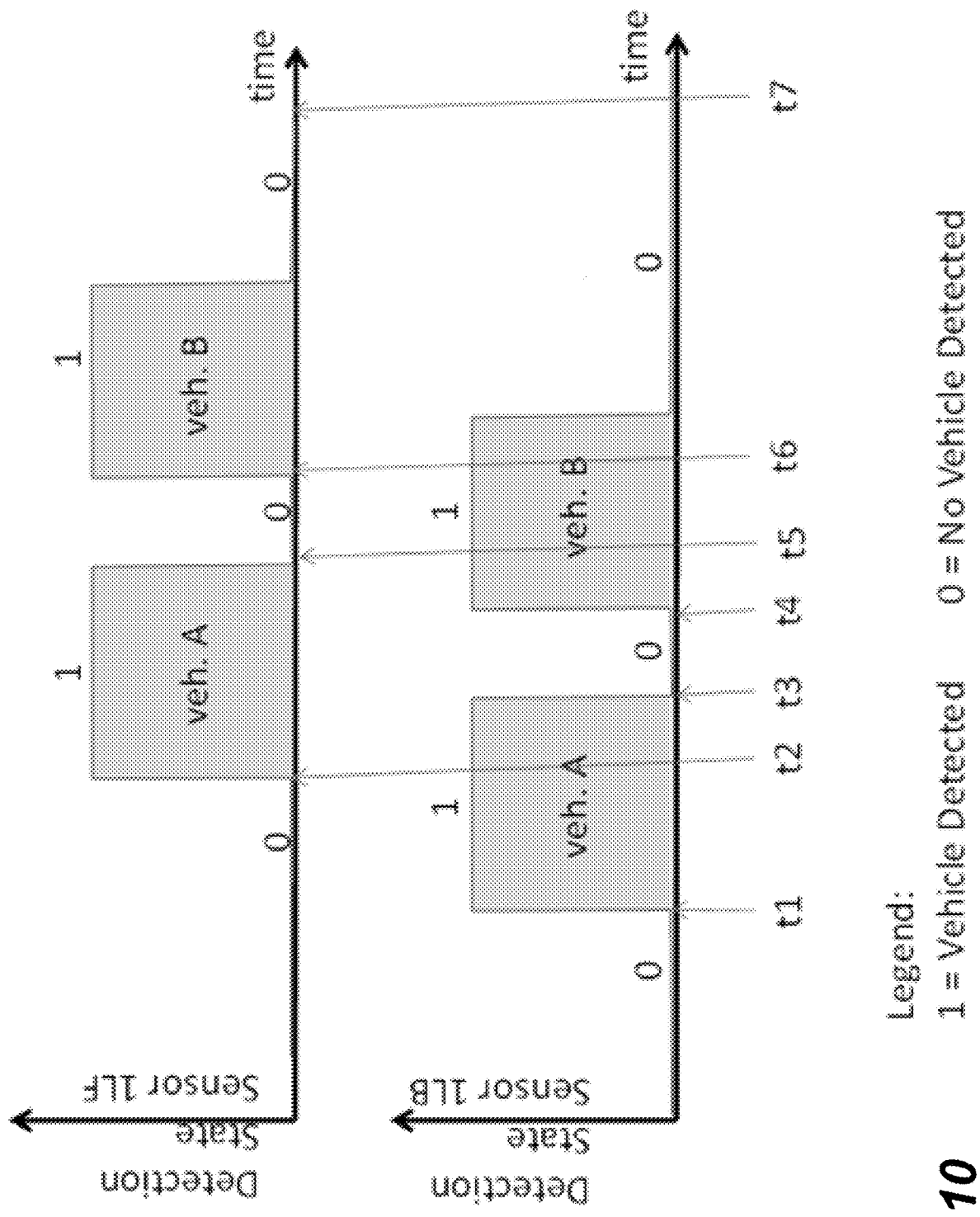
FIG. 10 illustrates the sensors 1LF & 1LB detection time profiles for the example illustrated in FIG. 9.

FIGS. 9(a-h) and 10 illustrate the different time points utilized in detecting a speeding or a tailgating violation. FIG. 10 illustrates the time stamps from the sensors on a detection time profile. In FIG. 9b, as the leading vehicle (A) passes vehicle (X), the sensor 1LB (located on the rear left of the monitoring vehicle (X)) detects the presence of vehicle (A), camera 2LC takes a shot of the front plate of vehicle (A) and the computing system (3) records the event as (t1). As vehicle (A) passes sensor 1LF (located on the front left), the time is recorded as t2 as shown in FIG. 9c. Hence, at this point the speed of vehicle (A) is expressed as following:

$$V_A = V_X + \frac{d}{t_2 - t_1} \quad (1)$$

Where,
$V_A$=speed of vehicle (A)
$V_X$=speed of vehicle X (Determined using GPS and CAN data)
$t_1$=time for vehicle (A) to enter the detection zone of sensor 1LB
$t_2$=time for vehicle (A) to enter the detection zone of sensor 1LF
d=distance between sensors 1LB and 1LF The velocity of vehicle (A) is compared to the speed limit. If the velocity of vehicle (A) is greater than the speed limit, a speeding violation is communicated to a transit authority through a communication modem (5).

If $V_A$ > Speed Limit ▷ Speeding Violation for Vehicle A, (2)

else, check for tailgating.

Tailgating is checked as follows. As shown in FIG. 9d, as vehicle (A) completely clears the range of sensor 1LB, the time is recorded (t3). In FIG. 9e, the following vehicle (B) passes through sensor 1LB and another time stamp is recorded (t4), then the first time gap between the two vehicles $t_{gap1}$ is calculated as follows:

$$t_{gap1} = t_4 - t_3 \quad (3)$$

The gap is then compared to a minimum gap between vehicles:

If $t_{gap1}$ < minimum Gap → Vehicle B may be tailgating Vehicle A (4)

Referring to FIG. 9f, as vehicle (A) completely clears the range of sensor 1LF, the time is recorded (t5). Referring to FIG. 9g, as the following vehicle (B) passes through sensor 1LF another time stamp is recorded (t6), and the second time gap between the two vehicles $t_{gap2}$ is calculated as follows:

$$t_{gap2} = t_6 - t_5 \quad (5)$$

If $t_{gap2}$<minimum Gap→Vehicle B is verified to be tailgating Vehicle A

It has been established that the status of vehicle (B) is that it has made a tailgating violation. Additionally, it must be determined whether vehicle (B) is speeding by the following equation:

$$V_B = V_X + \frac{d}{t_6 - t_4} \quad (6)$$

where,
$V_B$=Speed vehicle (B)
$V_X$=Speed vehicle X (Determined using GPS & CAN data)
$t_4$=Time for vehicle (B) passing sensor 1LB
$t_6$=Time for vehicle (B) passing sensor 1LF
d=Distance between sensors 1LB & 1LF
Then, If $V_B$ > Speed Limit ▷ Speeding Violation for Vehicle B (7)

Thus, vehicle (B) is also cited with a speeding violation when its speed is greater than the speed limit as determined by equation (7).

As shown in FIG. 9h, as vehicle (B) clears the detection zones of vehicle X by a reasonable distance (a meter, for example), the camera mounted on the left side (2LC) will take a shot of the back plates of vehicle (B) for proper citing and ticketing.

Finally, if any vehicle approaches vehicle (X) too closely from the rear and stays near it for a few seconds, k, where $_k$ equals 1 to 10 seconds, tailgating of vehicle (X) is determined and the back camera 2BC will take a shot for it for citation.

Detecting Street Racing

In the previous example, if both (A) and (B) are exceeding the speed limit significantly, and (B) is tailgating (A), then a street racing violation may be determined for both vehicles. The amount of exceeding the speed limit may be determined by the computer monitor by comparing the relative speeds of the vehicles on the roadway and determining an average speed, determining an unsafe speed for the conditions of the roadway. The amount of exceeding the speed limit may range from 10 to 50 mph.

As shown in FIG. 7, if vehicle (A) and B are not following each other, but vehicle (A) is passing vehicle (X) on the left side, and vehicle (B) is passing vehicle (X) on the right side, almost simultaneously and exceeding the speed limit, then a street racing violation may be determined for both vehicles. In this case, vehicle (B) will have another violation, which is improper passing.

Detecting Improper Passing

All vehicles passing vehicle (X) from the right side will be cited for improper passing when vehicle (X) is travelling at the speed limit.

Figure 11B:
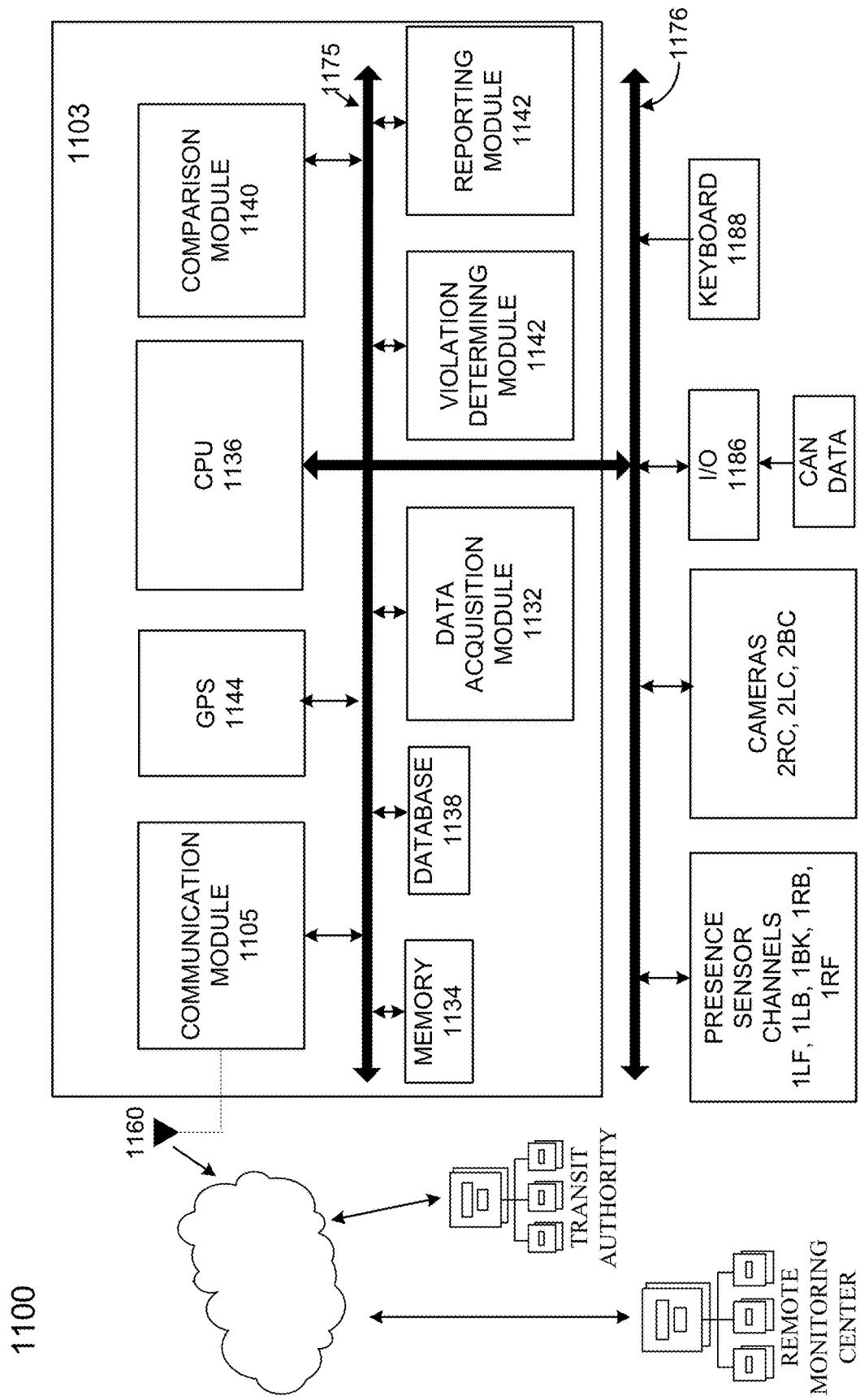
FIG. 11B illustrates the computing environment of the system.

FIG. 11B illustrates the computing environment 1100 of the aspects. Computer system 1103 includes data acquisition module 1132, memory 1134 and CPU 1136. The computer system includes a wireless communication module 1105 for transmitting a violations report to a transit authority. The communication module may also receive data signals from the presence sensors and the cameras if wireless presence sensors and cameras are used. The communication module may further receive commands and instructions from a remote monitoring center. The communications module is operatively connected to a GPS module 1144 to convey GPS data to the CPU. The communication module includes a wireless communication modem (represented by antenna symbol 1160) to upload violation incidents regularly to a transit authority for archival and citation processing. A reporting module 1142 may be used by the CPU to collect and prepare a violations report, which may be uploaded at intervals, such as hourly or daily.

The presence sensors and cameras are connected and controlled by the computer unit 1103 through the data acquisition channels mounted in the monitoring vehicle (X) or the roadway structure. The presence sensors and cameras may be directly connected to bus 1176 to convey data to the computer 1103 or may be wireless connected to the computer through the modem 1160 of the communication module 1105. In the second aspect, CAN data may be directly input to the computer through I/O port 1186 or alternatively directly connected to bus 1176. GPS receiver 1144 is included to determine the precise location and speed data of the monitoring vehicle (X) of the second aspect and is optional in the first aspect. The speed of the monitoring vehicle (X) is also acquired from the vehicle data bus by connecting the computer unit 1103 to the vehicle CAN network in the second aspect. Communication bus line 1175 provides a communication pathway to connect the components of computer system 1103. CPU 1136 is configured to instruct its processor to access program instructions stored in memory 1134 to store timestamps from the presence sensors and images from cameras in memory, subtract the time stamps, calculate the velocity of each approaching or passing vehicle from the timestamps, actuate the cameras to take images of the license plates of violating vehicles, compare, in comparison module 1140, the velocity of a vehicle to a designated speed limit of the roadway stored in database 1138, access the discrete features from database 1180, memory 1182 or alternatively from inputs received at I/O port 1186 or communication module 1166. The CPU 1136 is further configured to determine whether a violation event has occurred and to instruct the reporting module to create a violations report. The CPU 1136 is further configured to instruct the communications module 1105 to transmit the violations report to a transit authority. The remote monitoring center may communicate controls to the CPU, such as to start detecting, to shut down, to operate during specified hours of the day, and such like. Alternatively, these instructions may be entered through keyboard 1188 or to I/O port 1186. I/O port may be configured to accept remote instructions from a handheld unit or such like.

The first embodiment is illustrated with respect to FIG. 1-11B. The first embodiment describes a system for detecting aggressive driving violations of vehicles travelling on a roadway, comprising a plurality of presence sensors (1a, 1b, 1c, 1LB, 1RB, 1BK, 1LF, 1RF, FIG. 1, 5) spaced apart from one another, at least three digital cameras (3a, 3b, 2LC, 2RC, 1BK), a communication unit (5, 1105), a GPS receiver (4, 1144), a computer monitoring unit (2, 1103), wherein the monitoring unit is configured to receive signals from the presence sensors and determine relative speeds and time gaps between the vehicles from the signals, detect whether either a first vehicle or a second vehicle is driving aggressively, instruct at least one of the digital cameras to photograph a license plate of the first or second vehicle if either the first or the second vehicle is driving aggressively, and instruct the communication unit to transmit a violation report to a transit authority.

The presence sensors and the digital cameras may be mounted at spaced locations on a roadway median as shown in FIG. 1-4.

In a static system, the violation is one of tailgating, speeding and lane blocking.

The static system includes a tailgating scenario where a second vehicle is following the first vehicle, where there are three linearly spaced presence sensors, wherein the GPS receiver transmits a speed limit of the roadway to the computer monitoring unit, and wherein the computer monitoring unit determines a minimum time gap based on the speed limit, compares the time gaps between the first vehicle (A) and the second vehicle (B) at each of the three linearly spaced presence sensors to the minimum time gap, determines a tailgating violation if at least two of the time gaps are less than the minimum time gap, and instructs the communication unit to transmit a tailgating violation report to the transit authority.

A static system shown in FIGS. 1-4 and 11B includes speeding and lane blocking scenarios (FIG. 3-4) wherein the second vehicle is following the first vehicle, and wherein there are at least two presence sensors spaced apart linearly by a distance, d. The GPS receiver transmits a speed limit of the roadway to the computer monitoring unit 1103 which determines a time difference by subtracting the time at which the first vehicle passes a second presence sensor from the time at which the first vehicle passes a first presence sensor, calculates the velocity of the first vehicle by dividing the distance, d, by the time difference, compares the velocity of the first vehicle to a roadway speed limit, and determines a speeding violation for the first vehicle if the velocity is greater than the roadway speed limit, determines there is no speeding violation for the first vehicle if the velocity equals the speed limit of the roadway, and determines a lane blocking violation if the velocity is less than the speed limit of the roadway.

Alternatively, a dynamic system includes wherein the presence sensors and the digital cameras are mounted at spaced locations on a monitoring vehicle travelling on the roadway as shown in FIG. 5, a GPS module (4, 1144) operatively connected to the computer monitoring unit, wherein the GPS module is configured to determine estimated velocities of the vehicles on the roadway and the speed limit of the roadway and a CAN data unit of the vehicle operatively connected to the computer monitoring unit. The computer monitoring unit is configured to receive an estimated velocity of the monitoring vehicle from the GPS module, receive an estimated velocity of the monitoring vehicle from the CAN data unit, and correlate the estimated velocities to determine a corrected velocity, $V_X$, of the monitoring vehicle (X).

The monitoring vehicle has a length axis (L) and a width axis (W), a left front side, a left rear side, a right front side, a right rear side, a front bumper and a rear bumper, wherein each presence sensor is configured to interrogate the roadway with an electromagnetic beam (see 822, 824, FIG. 8), receive a return beam and generate a timestamp, wherein a first presence sensor (1LB) is mounted on the left rear bumper of the monitoring vehicle and configured to direct the beam away from the monitoring vehicle along the width axis, wherein a second presence sensor (1LF) is located on the left front bumper of the monitoring vehicle and configured to direct the beam away from the monitoring vehicle along the width axis, wherein a third presence sensor (1RB) is mounted on the right rear bumper of the monitoring vehicle and configured to direct the beam away from the monitoring vehicle along the width axis, wherein a fourth presence sensor 1RF) is located on the right front bumper of the monitoring vehicle and configured to direct the beam away from the monitoring vehicle along the width axis, wherein a fifth presence sensor 1BK) is located on the rear bumper and configured to direct the beam away from the monitoring vehicle along the length axis, wherein each digital camera has a field of view determined by the orientation of the camera, wherein a first digital camera (2LC) is located on the left front side of the monitoring vehicle and has a first field of view directed at a 45 degree angle with the width axis and away from the monitoring vehicle as shown in FIG. 5, wherein a second digital camera (2RC) is located on the right front side of the monitoring vehicle and has a second field of view directed at a 45 degree angle with the width axis and away from the monitoring vehicle, and wherein a third digital camera (2BC) is located on the rear bumper of the monitoring vehicle has a first field of view directed along the length axis away from the monitoring vehicle.

In the dynamic system shown in FIG. 5-11B, the violation may be one of speeding, tailgating, street racing and improper passing.

The computer monitoring unit is further configured to receive a first timestamp, $t_1$, as the first vehicle passes the first presence detector, instruct the first camera to take an image of the front bumper of the first vehicle, receive a second timestamp, $t_2$, as the first vehicle passes the second presence detector, determine the velocity, $V_A$, of the first vehicle based on $$V_{A1} = V_X + \frac{d}{t_2 - t_1}$$

where d equals a distance between the first presence sensor and the second presence sensor, receive the speed limit of the roadway from the GPS module, compare the velocity, $V_{A1}$, of the first vehicle to the speed limit, determine there is no speeding violation for the first vehicle if the velocity is equal to or is less than the speed limit of the roadway, determine a speeding violation for the first vehicle if the velocity is greater than the roadway speed limit, and prepare a first violation report including the velocity and image of the front bumper of the first vehicle.

The computer monitoring unit is further configured to receive a third timestamp, $t_3$, as the second vehicle passes the first presence detector, instruct the first camera to take an image of the front bumper of the second vehicle, receive a fourth timestamp, $t_4$, as the second vehicle passes the second presence detector, determine the velocity, $V_A$, of the second vehicle based on $$V_{A2} = V_X + \frac{d}{t_4 - t_3}$$

compare the velocity, $V_{A2}$, of the second vehicle to the speed limit, determine there is no speeding violation for the second vehicle if the velocity is equal to or is less than the speed limit of the roadway, determine a speeding violation for the second vehicle if the velocity is greater than the roadway speed limit, calculate a first time gap between the first and second vehicle at the first presence sensor by subtracting the third timestamp from the first timestamp, calculate a second time gap between the first and second vehicle at the second presence sensor by subtracting the fourth timestamp from the second timestamp, determine the second vehicle is tailgating the first vehicle if both the first and second time gaps are less than the minimum time gap, determine there is no tailgating violation for the second vehicle if the both the first and second time gaps are not less than the minimum time gap, and prepare a second violation report including the velocity and image of the front bumper of the second vehicle when the second vehicle is either speeding or tailgating.

In the dynamic system, the computer monitoring unit is further configured to receive a fifth timestamp, $t_5$, when the first vehicle is within the field of view of the fifth presence sensor and record the velocity, $V_5$, received from the GPS unit of the monitoring vehicle, receive a sixth timestamp, $t_6$, at a time $t_5+k$ seconds, where k equals 1 to 10 seconds and record the velocity, $V_6$, of the first vehicle, determine there is a tailgating violation by the first vehicle if $V_6$ is greater than $V_5$, determine there is a tailgating violation and a speeding violation if $V_6$ and $V_5$ are both greater than $V_X$, instruct the third camera to take an image of the front bumper of the first vehicle, prepare a second violation report including the velocity and image of the front bumper of the first vehicle when the first vehicle is either speeding or tailgating.

In the dynamic system, the computer monitoring unit is further configured to determine a street racing violation if any one of the following occur the second vehicle is tailgating the first vehicle and the velocities of both the first and the second vehicle exceed the speed limit by a threshold amount, wherein the threshold amount is ten to fifty miles per hour, and the first vehicle passes the monitoring vehicle on the left and the second vehicle simultaneously passes the monitoring vehicle on the right and the velocities of both the first and the second vehicle exceed the speed limit. The computer monitoring unit is further configured to determine an improper passing violation when a vehicle passes the monitoring vehicle on the right side when the monitoring vehicle is travelling at the speed limit.

The second embodiment is illustrated with respect to FIGS. 1-4, and 11B. The second embodiment describes a roadway detection system 100 placed on a roadway median, comprising cameras (3a, 3b, FIG. 1) spaced apart on the roadway median, presence sensors (1a, 1b, 1c) spaced apart on the roadway median and configured to generate timestamps when detecting passing vehicles, digital storage media (3, 1134) a communication unit (5, 1105), computer processing circuitry (4, 1103, FIG. 11) configured to determine aggressive driving violations by passing vehicles (A, B) in real-time by comparing the timestamps, instruct the cameras to take photos of front and/or rear license plates of offending vehicles, and instruct the communication unit to transmit the photos to a transit authority regarding the aggressive driving violations, wherein the aggressive driving violations include speeding, lane blocking, improper passing and tailgating.

The third embodiment is illustrated with respect to FIG. 5-11B. The third embodiment describes a system for detecting aggressive driving violations of vehicles travelling on a roadway, comprising a mobile unit (X) including a plurality of presence sensors (1LB, 1RB, 1BK, 1LF, 1RF, FIG. 5), at least three digital cameras (2LC, 2RC, 1BK), a communication unit (1105) and a monitoring unit (1100), wherein the monitoring unit includes a computer (1103), a digital storage unit (1134, 1138) and a GPS module (1144), and is operatively connected to a vehicle CAN unit. The monitoring unit is configured to receive signals from the presence sensors and the digital cameras, determine relative speeds of and distances between vehicles passing the mobile unit from the signals, detect whether either the first vehicle or the second vehicle is driving aggressively, instruct a digital camera to photograph either the first and the second vehicle when the first or the second vehicle is driving aggressively, and instruct the communication unit to transmit a violation report (as prepared in reporting module 1142) to a transit authority identifying an aggressive driving violation and including the photograph of the vehicle which is driving aggressively.

The system further includes wherein the GPS module is configured to determine estimated velocities of vehicles on the roadway and the speed limit of the roadway, wherein the computer monitoring unit is configured to receive an estimated velocity of the monitoring vehicle from the GPS module, receive an estimated velocity of the monitoring vehicle from the CAN data unit, and correlate the estimated velocities to determine a corrected velocity, $V_X$, of the monitoring vehicle.

Driving aggressively is one of speeding, tailgating, street racing and improper passing. The monitoring vehicle has a length axis, L, and a width axis, W, a left front side, a left rear side, a right front side, a right rear side, a front bumper and a rear bumper, wherein each presence sensor is configured to interrogate the roadway with an electromagnetic beam, receive a return beam and generate a timestamp, wherein the computer monitoring unit is further configured to receive a first timestamp, $t_1$, as a first vehicle passes a first presence sensor located on the left rear bumper of the monitoring vehicle, instruct the first camera located on the left front side of the monitoring vehicle to take an image of a front license plate of the first vehicle, receive a second timestamp, $t_2$, as the first vehicle passes a second presence sensor, determine a velocity, $V_{A1}$, of the first vehicle based on:

$$V_{A1} = V_X + \frac{d}{t_2 - t_1},$$

where d equals a distance between the first presence sensor and the second presence sensor, receive the speed limit of the roadway from the GPS module, compare the velocity, $V_{A1}$, of the first vehicle to the speed limit, determine there is no speeding violation for the first vehicle if the velocity is equal to or is less than the speed limit of the roadway, determine a speeding violation for the first vehicle if the velocity is greater than the speed limit of the roadway, and prepare a first violation report including the velocity and image of the front bumper of the first vehicle.

The computer monitoring unit is further configured to receive a third timestamp, $t_3$, as a second vehicle passes the first presence detector, instruct the first camera to take an image of the front license plate of the second vehicle, receive a fourth timestamp, $t_4$, as the second vehicle passes the second presence detector, determine the velocity, $V_A$, of the second vehicle based on $$V_{A_2} = V_X + \frac{d}{t_4 - t_3},$$

compare the velocity, $V_{A2}$, of the second vehicle to the speed limit, determine there is no speeding violation for the second vehicle if the velocity is equal to or is less than the speed limit of the roadway, determine a speeding violation for the second vehicle if the velocity is greater than the roadway speed limit, calculate a first time gap between the first and second vehicle at the first presence sensor by subtracting the third timestamp from the first timestamp, calculate a second time gap between the first and second vehicle at the second presence sensor by subtracting the fourth timestamp from the second timestamp, determine the second vehicle is tailgating the first vehicle if both the first and second time gaps are less than the minimum time gap, determine there is no tailgating violation for the second vehicle if the both the first and second time gaps are not less than the minimum time gap, prepare a second violation report including the velocity and image of the front bumper of the second vehicle when the second vehicle is either speeding or tailgating.

The computer monitoring unit is further configured to receive a fifth timestamp, $t_5$, when the first vehicle is within the field of view of the fifth presence sensor and record the velocity, $V_5$, received from the GPS unit of the monitoring vehicle, receive a sixth timestamp, $t_6$, at a time $t_5+k$ seconds, where k equals 1 to 10 seconds and record the velocity, $V_6$, of the first vehicle, determine there is a tailgating violation by the first vehicle if $V_6$ is greater than $V_5$, determine there is a tail-gaiting and a speeding violation if $V_6$ and $V_5$ are both greater than $V_X$, determine an improper passing violation when a vehicle passes the monitoring vehicle on the right side when the monitoring vehicle is travelling at the speed limit, determine a street racing violation if any one of the following occur the second vehicle is tailgating the first vehicle and the velocities of both the first and the second vehicle exceed the speed limit by a threshold amount, wherein the threshold amount is ten to fifty miles per hour, and the first vehicle passes the monitoring vehicle on the left and the second vehicle simultaneously passes the monitoring vehicle on the right and the velocities of both the first and the second vehicle exceed the speed limit, and prepare a second violation report including the velocities and images of the front or rear bumpers of any vehicle which is speeding, tailgating, street racing or improperly passing.

Figure 12:
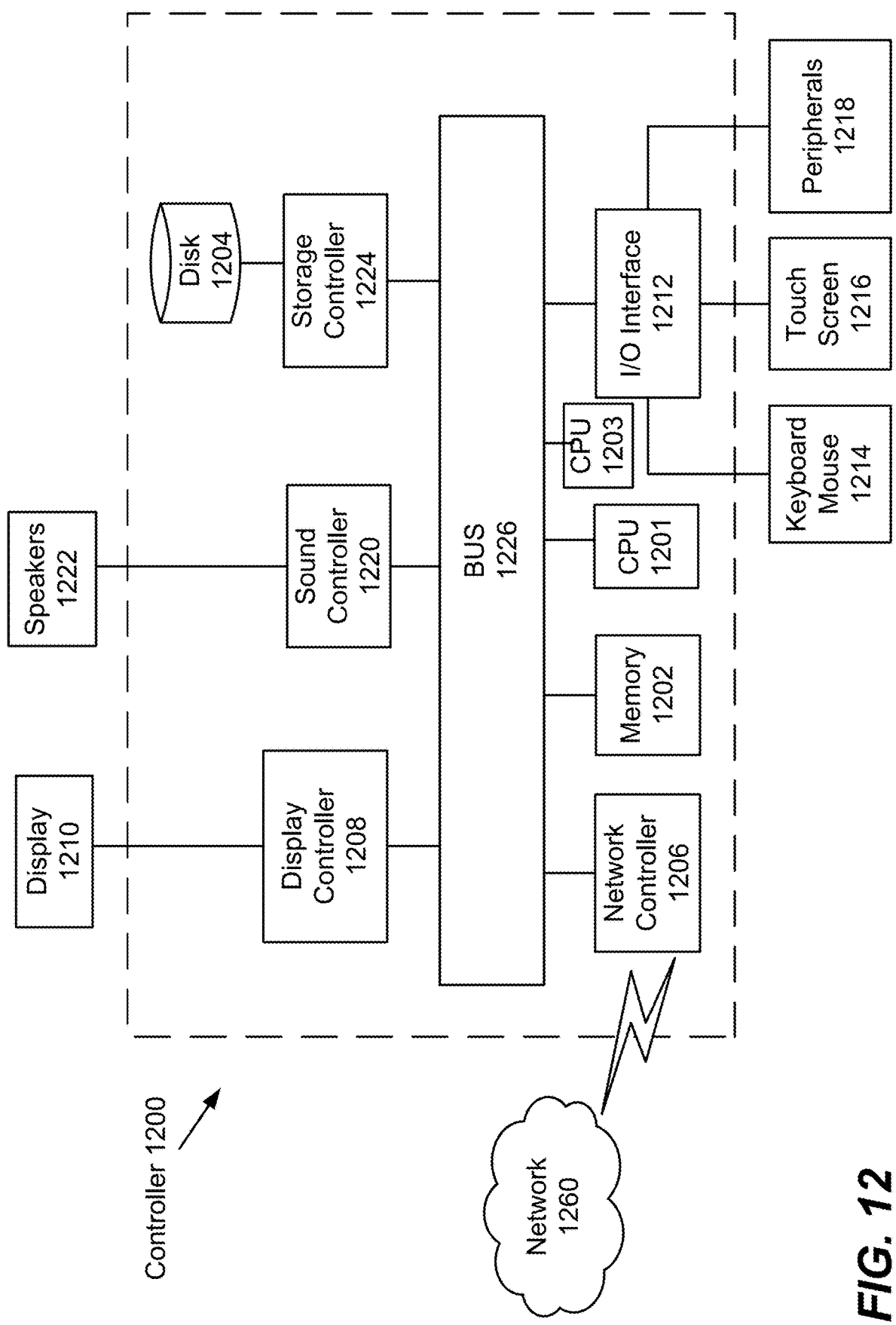
FIG. 12 is an illustration of a non-limiting example of details of computing hardware used in the computing system, according to certain embodiments.

Next, further details of the hardware description of the computing environment of FIG. 11 according to exemplary embodiments is described with reference to FIG. 12. In FIG. 12, a controller 1200 is described is representative of the system 1103 of FIG. 11 in which the controller is a computing device which includes a CPU 1201 which performs the processes described above/below. The process data and instructions may be stored in memory 1202. These processes and instructions may also be stored on a storage medium disk 1204 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 1201, 1203 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 13.

Figure 13:
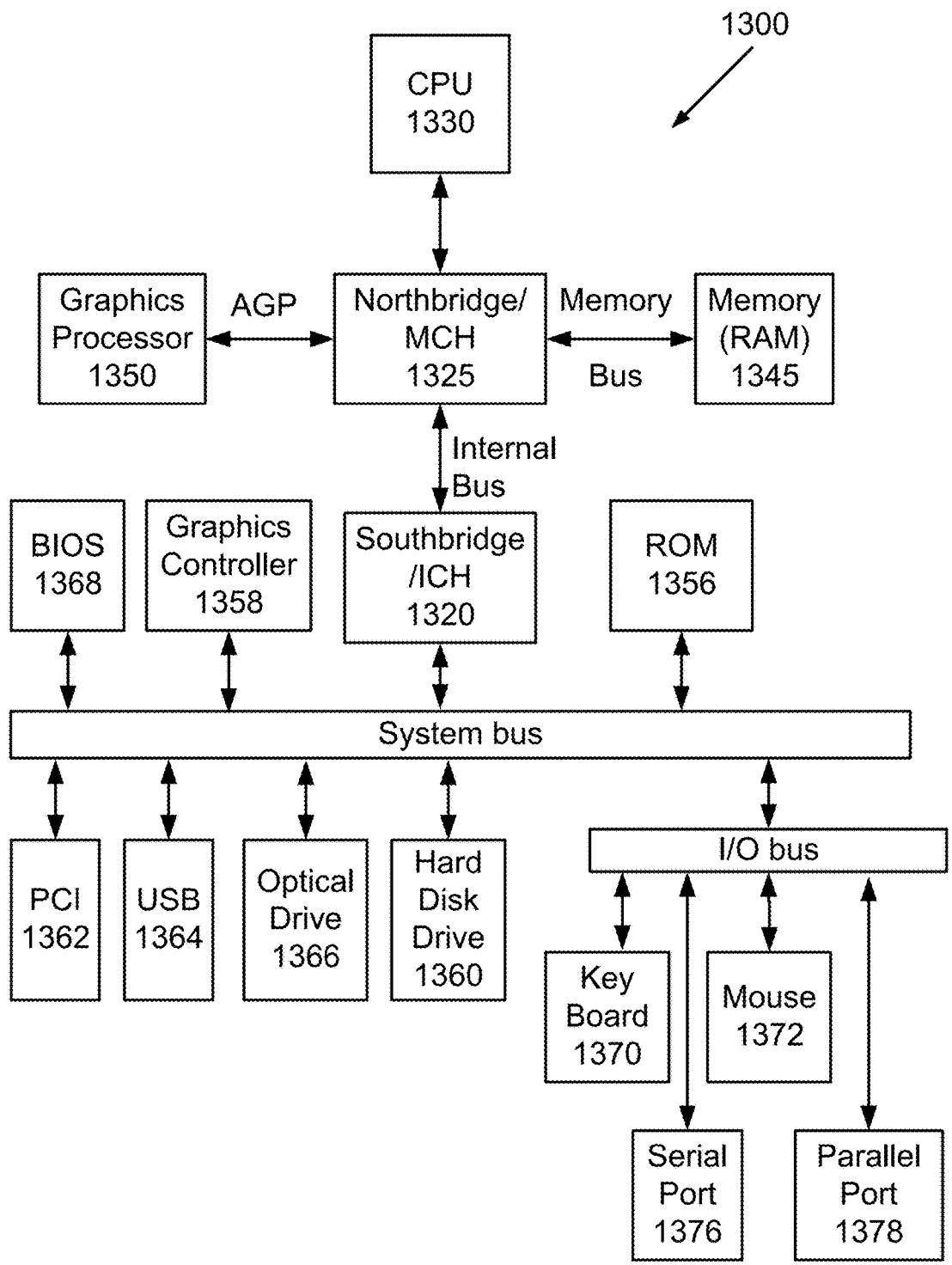
FIG. 13 is an exemplary schematic diagram of a data processing system used within the computing system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
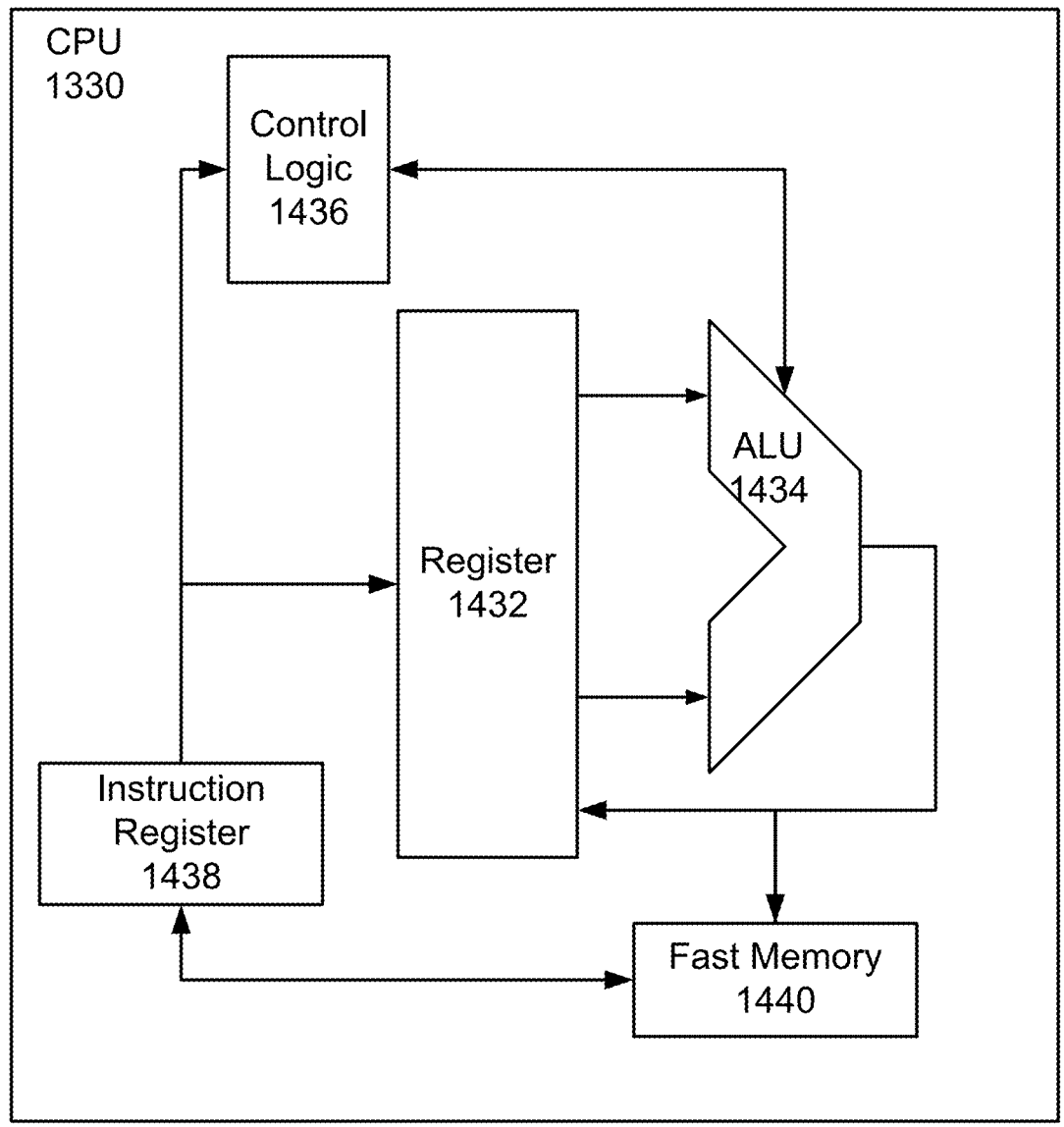
FIG. 14 is an exemplary schematic diagram of a processor used with the computing system, according to certain embodiments.

For example, FIG. 14 shows one implementation of CPU 1330. In one implementation, the instruction register 1438 retrieves instructions from the fast memory 1440. At least part of these instructions are fetched from the instruction register 1438 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 1388 through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 15:
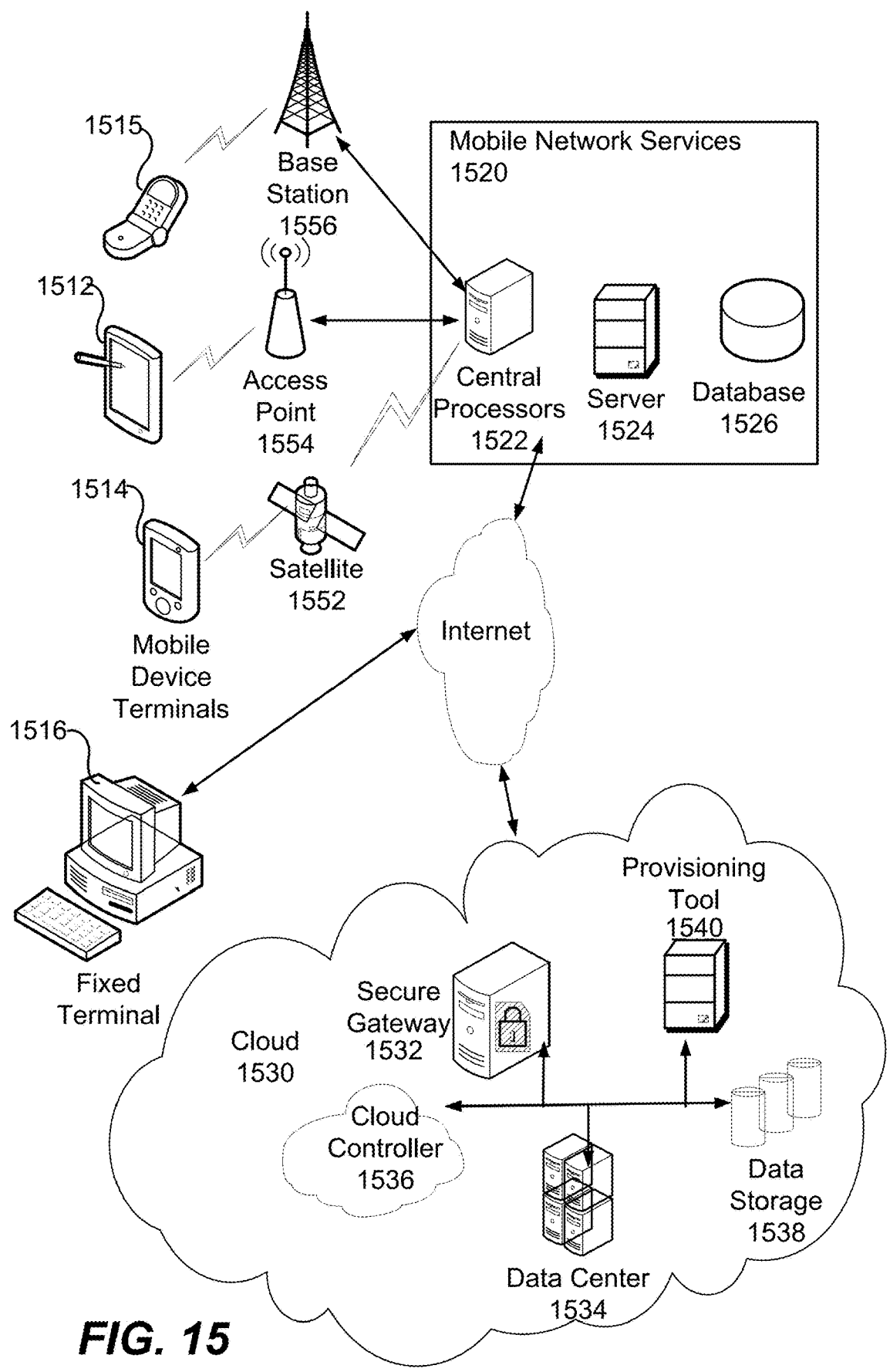
FIG. 15 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 15, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for detecting driving violations of vehicles travelling on a roadway, comprising:
at least five presence sensors mounted at spaced apart locations from one another on a monitoring vehicle travelling on said roadway, said at least five presence sensors comprising a first presence sensor, a second presence sensor, a third presence sensor, a fourth presence sensor, and a fifth presence sensor, and said at least five presence sensors being range-finding sensors each configured to interrogate said vehicles travelling on said roadway with electromagnetic beams, receive said electromagnetic beams returning to at least one of said at least five presence sensors after being reflected from one or more of said vehicles travelling on said roadway, and generate timestamp signals at each respective time of receiving each of said electromagnetic beams that have been returned, wherein the roadway is a divided highway with opposing lanes of traffic separated by a median;
at least three digital cameras mounted at spaced apart locations from one another and from each of said at least five presence sensors on said monitoring vehicle travelling on said roadway, said at least three digital cameras comprising a first digital camera, a second digital camera, and a third digital camera, and said at least three digital cameras each configured to collect visual data from a respective field of view determined by a respective orientation of each respective digital camera with respect to said monitoring vehicle;
wherein said monitoring vehicle has a length axis, a width axis, a left front side, a left rear side, a right front side, a right rear side, a front bumper comprising a left front side bumper portion and a right front side bumper portion, and a rear bumper comprising a left rear side bumper portion and a right rear side bumper portion;
wherein said first presence sensor is mounted on said left rear side bumper portion of said rear bumper of said monitoring vehicle and is configured to direct said electromagnetic beam away from said monitoring vehicle along said width axis;
wherein said second presence sensor is mounted on said left front side bumper portion of said front bumper of said monitoring vehicle and is configured to direct said electromagnetic beam away from said monitoring vehicle along said width axis;
wherein said third presence sensor is mounted on said right rear side bumper portion of said rear bumper of said monitoring vehicle and is configured to direct said electromagnetic beam away from said monitoring vehicle along said width axis;
wherein said fourth presence sensor is mounted on said right front side bumper portion of said front bumper of said monitoring vehicle and is configured to direct said electromagnetic beam away from said monitoring vehicle along said width axis;
wherein said fifth presence sensor is mounted on said rear bumper and is configured to direct said electromagnetic beam away from said monitoring vehicle along said length axis;
wherein said first digital camera is mounted on said left front side of said monitoring vehicle and has a first orientation configured to enable a first field of view directed at a 45-degree angle with said width axis and away from said monitoring vehicle;
wherein said second digital camera is mounted on said right front side of said monitoring vehicle and has a second orientation configured to enable a second field of view directed at a 45-degree angle with said width axis and away from said monitoring vehicle; and
wherein said third digital camera is mounted on said rear bumper of said monitoring vehicle and has a third orientation configured to enable a third field of view directed along said length axis away from said monitoring vehicle;
a communication unit located in said monitoring vehicle;
a computer monitoring unit located in said monitoring vehicle;
a global positioning system (GPS) module located in said monitoring vehicle operatively connected to said computer monitoring unit, wherein said GPS module is configured to determine estimated velocities of said vehicles travelling on said roadway, a speed limit of said roadway, and a first estimated velocity of said monitoring vehicle;

a controller area network (CAN) data unit located in said monitoring vehicle configured to determine a second estimated velocity of said monitoring vehicle, operatively connected to said computer monitoring unit;

wherein said computer monitoring unit is configured to:
receive said first estimated velocity of said monitoring vehicle from said GPS module;
receive said second estimated velocity of said monitoring vehicle from said CAN data unit;
arbitrate said first estimated velocity and said second estimated velocity to determine a corrected velocity, $V_x$, of said monitoring vehicle; receive said timestamp signals from said at least five presence sensors;
receive said visual data from said at least three digital cameras;
determine relative speeds and time gaps between said vehicles traveling on said roadway relative to each other and relative to said monitoring vehicle based on said timestamp signals, said visual data, and said corrected velocity, $V_x$, of said monitoring vehicle;
detect whether a first vehicle and/or a second vehicle of said vehicles traveling on said roadway is/are committing one or more of said driving violations based on said relative speeds and said time gaps determined, wherein said driving violations are one or more of speeding, tailgating, street racing, and/or improper passing;
instruct at least one of said at least three digital cameras to photograph a license plate of said first vehicle and/or said second vehicle of said vehicles traveling on said roadway that is/are detected as committing one or more of said driving violations; and
instruct said communication unit to transmit a violation report regarding said first vehicle and/or second vehicle of said vehicles traveling on said roadway that is/are detected as committing said one or more of said driving violations to a transit authority.

2. The system of claim 1, wherein detecting whether a first vehicle and/or a second vehicle of said vehicles traveling on said roadway is/are committing one or more of said driving violations comprises:
receive a first timestamp signal of said timestamp signals, t1, as said first vehicle of said one or more of said vehicles traveling on said roadway passes said first presence sensor;
receive a second timestamp signal, t2, as said first vehicle of said one or more of said vehicles traveling on said roadway passes said second presence sensor;
determine said first vehicle velocity, $V_{A1}$, of said first vehicle based on: $V_{A1}=V_x+d/(t_2-t_1)$, where d equals a first known distance between said first presence sensor and said second presence sensor;
receive said speed limit of said roadway from said GPS module;
compare said first vehicle velocity, $V_{A1}$, of said first vehicle of said one or more vehicles of said vehicles traveling on said roadway to said speed limit of said roadway;
determine that there is not a speeding violation of said driving violations committed by said first vehicle of said one or more vehicles of said vehicles traveling on said roadway if said first vehicle velocity, $V_{A1}$, of said first vehicle of said one or more vehicles of said vehicles traveling on said roadway is equal to or is less than said speed limit of said roadway;
determine that there is said speeding violation of said driving violations committed by said first vehicle of said one or more vehicles of said vehicles traveling on said roadway if said first vehicle velocity is greater than said speed limit of said roadway; and
prepare a first vehicle speeding violation report as at least part of said violation report including said first vehicle velocity, $V_{A1}$, of said first vehicle of said one or more vehicles of said vehicles traveling on said roadway and said image of said front license plate of said first vehicle of said one or more vehicles of said vehicles traveling on said roadway when determined to be committing said speeding violation of said driving violations.

3. The system of claim 2, wherein detecting whether a first vehicle and/or a second vehicle of said vehicles traveling on said roadway is/are committing one or more of said driving violations further comprises:
receive a third timestamp signal of said timestamp signals, $t_3$, as said second vehicle of said one or more vehicles of said vehicles traveling on said roadway passes said first presence sensor;
receive a fourth timestamp signal, $t_4$, as said second vehicle of said one or more vehicles of said vehicles traveling on said roadway passes said second presence sensor;
determine said second vehicle velocity, $V_{A2}$, of said second vehicle based on: $V_{A2}=V_x+d/(t_4-t_3)$, where d equals a first known distance between said first presence sensor and said second presence sensor;
receive said speed limit of said roadway from said GPS module;
compare said second vehicle velocity, $V_{A2}$, of said second vehicle of said one or more vehicles of said vehicles traveling on said roadway to said speed limit of said roadway;
determine that there is not a speeding violation of said driving violations committed by said second vehicle of said one or more vehicles of said vehicles traveling on said roadway if said second vehicle velocity, $V_{A2}$, of said second vehicle of said one or more vehicles of said vehicles traveling on said roadway is equal to or is less than said speed limit of said roadway;
determine that there is said speeding violation of said driving violations committed by said second vehicle of said one or more vehicles of said vehicles traveling on said roadway if said second vehicle velocity is greater than said speed limit of said roadway;
prepare a second vehicle speeding violation report as at least part of said violation report including said second vehicle velocity, $V_{A2}$, of said second vehicle of said one or more vehicles of said vehicles traveling on said roadway and said image of said front license plate of said second vehicle of said one or more vehicles of said vehicles traveling on said roadway when determined to be committing said speeding violation of said driving violations;
calculate a first time gap of said time gaps between said first vehicle of said one or more vehicles of said vehicles traveling on said roadway and said second vehicle of said one or more vehicles of said vehicles traveling on said roadway, at said first presence sensor, by subtracting said third timestamp signal, $t_3$, from said first timestamp signal, $t_1$;
calculate a second time gap of said time gaps between said first vehicle of said one or more vehicles of said vehicles traveling on said roadway and said second vehicle of said one or more vehicles of said vehicles traveling on said roadway, at said second presence sensor, by subtracting said fourth timestamp signal, $t_4$, from said second timestamp signal, $t_2$;

determine a minimum safety-based time gap based on a relative difference in speeds of said first vehicle of said one or more vehicles of said vehicles traveling on said roadway and said second vehicle of said one or more vehicles of said vehicles traveling on said roadway;

determine that there is a tailgating violation of said driving violations committed by said second vehicle of said one or more vehicle of said vehicles traveling on said roadway if both said first time gap of said time gaps and said second time gap of said time gaps are less than said minimum safety-based time gap;

determine that there is not said tailgating violation of said driving violations committed by said second vehicle of said one or more vehicles of said vehicles traveling on said roadway if one or more of said first time gap of said time gaps and said second time gap of said time gaps is/are not less than said minimum safety-based time gap; and prepare a second vehicle tailgating violation report as at least part of said violation report including said first time gap of said time gaps and said second time gap of said time gaps, said second vehicle velocity, $V_{A2}$, of said second vehicle of said one or more vehicles of said vehicles traveling on said roadway, and said image of said front license plate of said second vehicle of said one or more vehicles of said vehicles traveling on said roadway when determined to be committing said tailgating violation of said driving violations.

4. The system of claim 3, wherein detecting whether a first vehicle and/or a second vehicle of said vehicles traveling on said roadway is/are committing one or more of said driving violations further comprises:

determine that there is at least one street racing violation of said driving violations committed by said first vehicle of said vehicles traveling on said roadway and/or said second vehicle of said vehicles traveling on said roadway if either of the following occur:

if said second vehicle tailgating violation report has been prepared and both of said first vehicle velocity, $V_{A1}$, of said first vehicle of said one or more vehicles of said vehicles traveling on said roadway and said second vehicle velocity, $V_{A2}$, of said second vehicle of said one or more vehicles of said vehicles traveling on said roadway each exceed said speed limit of said roadway by a threshold amount, wherein said threshold amount is within a range of ten to fifty miles per hour; or if both of said first vehicle speeding violation report and said second vehicle speeding violation report have been prepared, and said first vehicle of said one or more vehicles of said vehicles traveling on said roadway passes said first presence sensor and said second presence sensor of said monitoring vehicle and said second vehicle of said one or more vehicles of said vehicles traveling on said roadway simultaneously passes said third presence sensor and said fourth presence sensor of said monitoring vehicle.

5. The system of claim 3, wherein detecting whether a first vehicle and/or a second vehicle of said vehicles traveling on said roadway is/are committing one or more of said driving violations further comprises:

determine that there is at least one improper passing violation of said driving violations committed by said first vehicle of said vehicles traveling on said roadway and/or said second vehicle of said vehicles traveling on said roadway if one or both of the following occur:

if said first vehicle of said one or more vehicles of said vehicles traveling on said roadway passes said third presence sensor and said fourth presence sensor of said monitoring vehicle when the monitoring vehicle is travelling at said speed limit of said roadway; and/or if said second vehicle of said one or more vehicles of said vehicles traveling on said roadway passes said third presence sensor and said fourth presence sensor of said monitoring vehicle when the monitoring vehicle is travelling at said speed limit of said roadway.

* * * * *